United States Patent
Sudo et al.

(10) Patent No.: US 10,649,448 B2
(45) Date of Patent: May 12, 2020

(54) PLANT MONITORING APPARATUS

(71) Applicant: KABUSHIKI KAISHA TOSHIBA, Minato-ku (JP)

(72) Inventors: Ayumi Sudo, Fuchu (JP); Tsuneo Watanabe, Inagi (JP); Hirokazu Ootsuka, Fuchu (JP); Akiyoshi Sudo, Fuchu (JP); Keiko Ootani, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 198 days.

(21) Appl. No.: 15/593,787

(22) Filed: May 12, 2017

(65) Prior Publication Data
US 2017/0248942 A1    Aug. 31, 2017

Related U.S. Application Data

(63) Continuation of application No. PCT/JP2015/083664, filed on Nov. 30, 2015.

(30) Foreign Application Priority Data

Dec. 16, 2014 (JP) .................. 2014-254300

(51) Int. Cl.
*G05B 9/02* (2006.01)
*G05B 23/02* (2006.01)

(52) U.S. Cl.
CPC ....... *G05B 23/027* (2013.01); *G05B 23/0232* (2013.01); *G05B 23/0272* (2013.01); *G05B 23/0291* (2013.01)

(58) Field of Classification Search
CPC .............. G05B 23/0232; G05B 23/027; G05B 23/0272; G05B 23/0291; G05B 23/02
See application file for complete search history.

(56) References Cited

U.S. PATENT DOCUMENTS

| 4,218,734 A * | 8/1980 | Ito ...................... G05B 23/0272 345/581 |
| 8,502,822 B2 * | 8/2013 | Rabin ................... G06T 11/206 345/440 |

(Continued)

FOREIGN PATENT DOCUMENTS

| JP | 9-16250 | 1/1997 |
| JP | 2000-10625 A | 1/2000 |

(Continued)

OTHER PUBLICATIONS

International Search Report dated Feb. 23, 2016 in PCT/JP2015/083664, filed on Nov. 30, 2015.

(Continued)

*Primary Examiner* — Zhipeng Wang
(74) *Attorney, Agent, or Firm* — Oblon, McClelland, Maier & Neustadt, L.L.P.

(57) ABSTRACT

A plant monitoring apparatus according to an embodiment includes a determiner and a display processor. The determiner compares a first process value acquired in time series from a first point of a monitoring target in a plant and a limit value corresponding to the first process value to determine a time when the first process value exceeds the limit value. The display processor causes a display device to display, in time series, the first process value within a time range decided on the basis of the time obtained by the determiner and the limit value corresponding to the first process value.

8 Claims, 29 Drawing Sheets

(56) References Cited

U.S. PATENT DOCUMENTS

| | | | |
|---|---|---|---|
| 2002/0055790 A1* | 5/2002 | Havekost | G05B 23/027 700/80 |
| 2002/0173935 A1 | 11/2002 | Miura | |
| 2005/0197805 A1* | 9/2005 | Eryurek | G05B 23/0264 702/188 |
| 2009/0062933 A1* | 3/2009 | Eryurek | G05B 23/0264 700/12 |
| 2010/0198555 A1* | 8/2010 | Takahama | F01D 19/00 702/179 |
| 2011/0010662 A1* | 1/2011 | Zhang | G05B 23/0232 715/806 |
| 2011/0213488 A1* | 9/2011 | Suzuki | G05B 23/0272 700/109 |
| 2013/0218522 A1* | 8/2013 | Suzuki | G05B 23/0208 702/183 |
| 2015/0019040 A1* | 1/2015 | Tanaka | G05D 23/1919 700/299 |
| 2015/0378806 A1* | 12/2015 | Natsumeda | G06F 11/3447 714/37 |
| 2016/0163179 A1* | 6/2016 | Matsumoto | G08B 21/182 340/540 |
| 2016/0195873 A1* | 7/2016 | Takegawa | G05B 23/0232 700/52 |

FOREIGN PATENT DOCUMENTS

| | | | | |
|---|---|---|---|---|
| JP | 2001-331215 A | 11/2001 | | |
| JP | 2001-337721 | 12/2001 | | |
| JP | 2012-138044 A | 7/2012 | | |
| JP | 2012138044 A | * | 7/2012 | G05B 23/0216 |
| JP | 2013-137444 A | 7/2013 | | |
| JP | 6445859 B2 | 12/2018 | | |

OTHER PUBLICATIONS

Hideyuki, T. "Studies on Data Management in Manufacturing Line Monitoring and Control", Thesis or Dissertation, Mar. 23, 2001, 61 pages.

Hideyuki, T. et al, "The Time/Place/Object Model for Tracking and History Management in Manufacturing Line Control", Proceeding DANTE '99 Proceedings of the 1999 International Symposium on Database Applications in Non-Traditional Environments, Nov. 28-30, 1999, pp. 385-394.

* cited by examiner

| DATE AND TIME | TAG123 | TAG234 | TAG815 | TAG496 | TAG755 | TAG524 | TAG462 |
|---|---|---|---|---|---|---|---|
| 2014/8/10 10:31:01 | 10.6 | 13.78 | 5.512 | 7.7168 | 1.9292 | 9.646 | 1.15752 |
| 2014/8/10 10:31:02 | 10.8 | 14.04 | 5.616 | 7.8624 | 1.9656 | 9.828 | 1.17936 |
| 2014/8/10 10:31:03 | 11.6 | 15.08 | 6.032 | 8.4448 | 2.1112 | 10.556 | 1.26672 |
| 2014/8/10 10:31:04 | 12.4 | 16.12 | 6.448 | 9.0272 | 2.2568 | 11.284 | 1.35408 |
| 2014/8/10 10:31:05 | 12.8 | 16.64 | 6.656 | 9.3184 | 2.3296 | 11.648 | 1.39776 |
| 2014/8/10 10:31:06 | 11.9 | 15.47 | 6.188 | 8.6632 | 2.1658 | 10.829 | 1.29948 |
| 2014/8/10 10:31:07 | 13.5 | 17.55 | 7.02 | 9.828 | 2.457 | 12.285 | 1.4742 |
| 2014/8/10 10:31:08 | 13.9 | 18.07 | 7.228 | 10.1192 | 2.5298 | 12.649 | 1.51788 |
| 2014/8/10 10:31:09 | 14.6 | 18.98 | 7.592 | 10.6288 | 2.6572 | 13.286 | 1.59432 |
| 2014/8/10 10:31:10 | 16.7 | 21.71 | 8.684 | 12.1576 | 3.0394 | 15.197 | 1.82364 |
| 2014/8/10 10:31:11 | 15.6 | 20.28 | 8.112 | 11.3568 | 2.8392 | 14.196 | 1.70352 |
| 2014/8/10 10:31:12 | 15.2 | 19.76 | 7.904 | 11.0656 | 2.7664 | 13.832 | 1.65984 |
| 2014/8/10 10:31:13 | 12.3 | 15.99 | 6.396 | 8.9544 | 2.2386 | 11.193 | 1.34316 |
| 2014/8/10 10:31:14 | 11.1 | 14.43 | 5.772 | 8.0808 | 2.0202 | 10.101 | 1.21212 |
| 2014/8/10 10:31:15 | 13.4 | 17.42 | 6.968 | 9.7552 | 2.4388 | 12.194 | 1.46328 |
| 2014/8/10 10:31:16 | 14.5 | 18.85 | 7.54 | 10.556 | 2.639 | 13.195 | 1.5834 |

FIG. 3

LIMIT VALUE DATA

| Y-PID | LIMIT VALUE TYPE | LIM | LIMIT VALUE | X-PID | Z-PID | UNIT |
|---|---|---|---|---|---|---|
| TAG1234 | VAL1 | LIM1 | CRV123 | TAG0100 | | °C |
| | | LIM2 | CRV124 | TAG0100 | | |
| | | LIM3 | CRV125 | TAG0100 | | |
| | | LIM4 | CRV126 | TAG0100 | | |
| TAG2345 | VAL2 | LIM1 | CRV127 | TAG0100 | TAG0200 | MPA |
| | | LIM2 | CRV128 | TAG0100 | TAG0200 | |
| | | LIM3 | CRV129 | TAG0100 | TAG0200 | |
| | | LIM4 | CRV130 | TAG0100 | TAG0200 | |
| TAG9876 | VAL1 | LIM1 | CRV131 | | | °C |
| | | LIM2 | CRV132 | | | |
| | | LIM3 | CRV133 | | | |
| | | LIM4 | CRV134 | | | |
| TAG7788 | VAL2 | LIM1 | CRV135 | TAG0400 | TAG0600 | °C |
| | | LIM2 | CRV136 | TAG0400 | TAG0600 | |
| | | LIM3 | CRV137 | TAG0400 | TAG0600 | |
| | | LIM4 | CRV138 | TAG0400 | TAG0600 | |
| TAG8516 | FIX | LIM1 | 330 | | | °C |
| | | LIM2 | 340 | | | |
| | | LIM3 | 350 | | | |
| | | LIM4 | 360 | | | |
| TAG7561 | FIX | LIM1 | 5 | | | MPA |
| | | LIM2 | 10 | | | |
| | | LIM3 | 15 | | | |
| | | LIM4 | 20 | | | |
| TAG7516 | FIX | LIM1 | 510 | | | °C |
| | | LIM2 | 520 | | | |
| | | LIM3 | 530 | | | |
| | | LIM4 | 540 | | | |
| TAG5165 | FIX | LIM1 | 2500 | | | °C |
| | | LIM2 | 2600 | | | |
| | | LIM3 | 2700 | | | |
| | | LIM4 | 2800 | | | |

CURVE DATA

| CRV | X | Z | Y |
|---|---|---|---|
| CRV123 | 0 | 0 | 315 |
| | 25 | 0 | 330 |
| | 75 | 0 | 350 |
| CRV124 | 0 | 0 | 325 |
| | 25 | 0 | 340 |
| | 75 | 0 | 360 |
| CRV125 | 0 | 0 | 335 |
| | 25 | 0 | 350 |
| | 75 | 0 | 370 |
| CRV126 | 0 | 0 | 345 |
| | 25 | 0 | 360 |
| | 75 | 0 | 380 |
| CRV127 | 0 | 2.5 | 5 |
| | 60 | 3.5 | 15 |
| | 120 | 4.5 | 25 |
| CRV128 | 0 | 5 | 10 |
| | 60 | 15 | 20 |
| | 120 | 25 | 30 |
| CRV129 | 0 | 50 | 15 |
| | 60 | 60 | 25 |
| | 120 | 70 | 35 |
| CRV130 | 0 | 65 | 20 |
| | 60 | 75 | 30 |
| | 120 | 85 | 40 |

FIG. 6

| DATE AND TIME | TAG123 PROCESS VALUE | TAG123 UPPER-UPPER LIMIT | TAG123 UPPER LIMIT | TAG123 LOWER LIMIT | TAG123 LOWER-LOWER LIMIT | TAG123 WARNING STATE |
|---|---|---|---|---|---|---|
| 2014/8/10 10:31:01 | 10.6 | 13.78 | 9.65 | -9.646 | -13.78 | 1 |
| 2014/8/11 10:31:02 | 10.8 | 14.04 | 9.83 | -9.828 | -14.04 | 1 |
| 2014/8/12 10:31:03 | 11.6 | 15.08 | 10.56 | -10.556 | -15.08 | 1 |
| 2014/8/13 10:31:04 | 12.4 | 16.12 | 11.28 | -11.284 | -16.12 | 1 |
| 2014/8/14 10:31:05 | 12.8 | 16.64 | 11.65 | -11.648 | -16.64 | 0 |
| 2014/8/15 10:31:06 | 11.9 | 15.47 | 10.83 | -10.829 | -15.47 | 0 |
| 2014/8/16 10:31:07 | 13.5 | 17.55 | 12.29 | -12.285 | -17.55 | 0 |
| 2014/8/17 10:31:08 | 13.9 | 18.07 | 12.65 | -12.649 | -18.07 | 0 |
| 2014/8/18 10:31:09 | 14.6 | 18.98 | 13.29 | -13.286 | -18.98 | 0 |
| 2014/8/19 10:31:10 | 16.7 | 21.71 | 15.20 | -15.197 | -21.71 | 0 |
| 2014/8/20 10:31:11 | 15.6 | 20.28 | 14.20 | -14.196 | -20.28 | 0 |
| 2014/8/21 10:31:12 | 15.2 | 19.76 | 13.83 | -13.832 | -19.76 | 1 |
| 2014/8/22 10:31:13 | 12.3 | 15.99 | 11.19 | -11.193 | -15.99 | 1 |
| 2014/8/23 10:31:14 | 11.1 | 14.43 | 10.10 | -10.101 | -14.43 | 1 |
| 2014/8/24 10:31:15 | 13.4 | 17.42 | 12.19 | -12.194 | -17.42 | 1 |
| 2014/8/25 10:31:16 | 14.5 | 18.85 | 13.20 | -13.195 | -18.85 | 1 |

FIG. 7

| TIME | PID | MESSAGE | LIMIT VALUE | WARNING STATE |
|---|---|---|---|---|
| YYYY/MM/DD hh:mm:ss | TAG1234 | XXXXXXXX TEMPERATURE 350°C > 360°C | 2 | 1 |
| YYYY/MM/DD hh:mm:ss | TAG2345 | XXXXXXXX PRESSURE 10.5MPa > 15MPa | 1 | 1 |
| YYYY/MM/DD hh:mm:ss | TAG4444 | XXXXXXXX APPARATUS FAILURE OCCURRENCE | 3 | 1 |
| YYYY/MM/DD hh:mm:ss | TAG0022 | XXXXXXXX SENSOR ABNORMALITY OCCURRENCE | 3 | 1 |
| YYYY/MM/DD hh:mm:ss | TAG9876 | XXXXXXX TEMPERATURE 530°C < 520°C | -1 | 1 |
| YYYY/MM/DD hh:mm:ss | TAG7788 | XXXXXXX TEMPERATURE 3000°C < 2500°C | -2 | 1 |
| YYYY/MM/DD hh:mm:ss | TAG1199 | XXXXXXXX TEMPERATURE LOW OCCURRENCE | -2 | 1 |
| YYYY/MM/DD hh:mm:ss | TAG3333 | XXXXXXXX SENSOR ABNORMALITY RECOVERY | 3 | 0 |
| YYYY/MM/DD hh:mm:ss | TAG6757 | XXXXXXXX SENSOR ABNORMALITY RECOVERY | 3 | 0 |
| YYYY/MM/DD hh:mm:ss | TAG0945 | XXXXXXXX APPARATUS FAILURE RECOVERY | 3 | 0 |
| YYYY/MM/DD hh:mm:ss | TAG2776 | XXXXXXXX WATER LEVEL HIGH RECOVERY 1.5cm | 2 | 0 |
| YYYY/MM/DD hh:mm:ss | TAG8765 | XXXXXXXX WATER LEVEL LOW RECOVERY 30cm | -2 | 0 |
| YYYY/MM/DD hh:mm:ss | TAG1212 | XXXXXXXX TEMPERATURE LOW RECOVERY 200°C | -1 | 0 |
| YYYY/MM/DD hh:mm:ss | TAG0440 | XXXXXXXX PRESSURE HIGH RECOVERY 3MPa | 1 | 0 |
| YYYY/MM/DD hh:mm:ss | TAG8788 | XXXXXXXX APPARATUS FAILURE RECOVERY | 3 | 0 |
| YYYY/MM/DD hh:mm:ss | TAG1111 | | | |

2: UPPER-UPPER LIMIT  
1: UPPER LIMIT  
-1: LOWER LIMIT  
-2: LOWER-LOWER LIMIT  
3: CONTACT WARNING

1: OCCURRENCE  
0: RECOVERY

FIG. 8

WARNING SCREEN

| OCCURRENCE DATE AND TIME | PID | NAME | MESSAGE | PRESENT VALUE | LIMIT VALUE |
|---|---|---|---|---|---|
| 2014/08/09 15:30:00 | TAG1234 | MAIN STEAM TEMPERATURE | XXXXYXX TEMPERATURE 350°C | 350°C | < 360°C |
| YYYY/MM/DD hh:mm:ss | TAG2345 | XXXXX | XXXXYXX PRESSURE 10.5MPa > 15MPa | | |
| YYYY/MM/DD hh:mm:ss | TAG4444 | XXXXX | XXXXX APPARATUS FAILURE OCCURRENCE | | |
| YYYY/MM/DD hh:mm:ss | TAG0022 | XXXXX | XXXX SENSOR ABNORMALITY OCCURRENCE | | |
| YYYY/MM/DD hh:mm:ss | TAG9876 | XXXXX | XXXXXX TEMPERATURE 530°C | 530°C | < 520°C |
| YYYY/MM/DD hh:mm:ss | TAG7788 | XXXXX | XXXXXXX TEMPERATURE 3000°C | 3000°C | < 2500°C |

GRAPH DISPLAY — 21

| WARNING SCREEN | | | | 1/nn |
|---|---|---|---|---|
| OCCURRENCE DATE AND TIME | PID | NAME | MESSAGE | |
| YYYY/MM/DD hh:mm:ss | TAG1234 | X X X X | X X X X X X X | TEMPERATURE LOW OCCURRENCE |
| YYYY/MM/DD hh:mm:ss | TAG2345 | X X X X | X X X X X X X | PRESSURE LOW OCCURRENCE |
| YYYY/MM/DD hh:mm:ss | TAG4444 | X X X X X | X X X X X X | APPARATUS FAILURE OCCURRENCE |
| YYYY/MM/DD hh:mm:ss | TAG0022 | X X X X | X X X X X X | SENSOR ABNORMALITY OCCURRENCE |
| YYYY/MM/DD hh:mm:ss | TAG9876 | X X X X | X X X X X X X | TEMPERATURE LOW OCCURRENCE |
| YYYY/MM/DD hh:mm:ss | TAG7788 | X X X X | X X X X X X X | TEMPERATURE HIGH OCCURRENCE |

GRAPH DISPLAY

FIG. 27

PLANT MONITORING APPARATUS

CROSS REFERENCE TO RELATED APPLICATIONS

This application is based upon and claims the benefit of priority from the prior Japanese Patent Application No. 2014-254300, filed on Dec. 16, 2014, the entire contents of which are incorporated herein by reference.

FIELD

The present invention relates to a plant monitoring apparatus.

BACKGROUND

A plant monitoring apparatus that performs monitoring of a power generation plant, a chemical plant, or the like includes many functions for monitoring the plant. Examples of such functions include a warning monitoring function and a graph display function. The warning monitoring function is, for example, a function for notifying an operator that the plant falls into a warning state.

As a method of notifying a warning, for example, there is a method of displaying warning messages in time series as a list on a warning screen 18 illustrated in FIG. 27 to notify the warning to the operator. In this case, the operator checks a change in a process value obtained from a point, where the plant falls into the warning state, to check a state of a monitoring target in which the point is arranged. For example, a graph screen 19 on which a process value is displayed in time series illustrated in FIG. 28 is displayed on a display device using the graph display function.

However, on the graph screen 19 in the past, only a process value set as a monitoring target is displayed. For example, FIG. 29 shows a time-series change of a process value 290 after the plant falls into the warning state. When such a time-series change of the process value 290 is displayed on the graph screen 19 in the past, the time-series change after the plant falls into the warning state (a star mark) is a substantially fixed value. Therefore, the warning state does not seem to be worsening.

However, since a process value 291 used for calculation of a limit value corresponding to the process value 290 gradually decreases, a value of the limit value also gradually decreases. Therefore, a difference between the limit value and the process value 290 gradually increases. The plant is changing to a dangerous state. In this way, it is sometimes difficult to grasp a tendency of the state change of the monitoring target, that is, whether the state of the plant is worsening or improving according to the elapse of time.

In the graph display function in the past, for example, since display processing of the graph is performed using a screen different from the warning screen, the processing is complicated. For example, the graph cannot be immediately displayed from the warning screen.

BRIEF DESCRIPTION OF THE DRAWINGS

FIG. 3 is a diagram illustrating a data format of process values;
FIG. 6 is a diagram illustrating limit value data, which is an example of limit value information;
FIG. 7 is a diagram illustrating data in a storage 30;
FIG. 8 is a diagram showing an example of warning occurrence data;
FIG. 9 is a diagram illustrating a warning screen;
FIG. 13 is a diagram illustrating a warning message in a warning screen;
FIG. 27 is a diagram illustrating a warning screen.

DETAILED DESCRIPTION

Embodiments of the present invention are explained below with reference to the drawings.

The configuration of a plant monitoring apparatus 1 according to a first embodiment is explained with reference to FIGS. 1 to 11.

Figure 1:
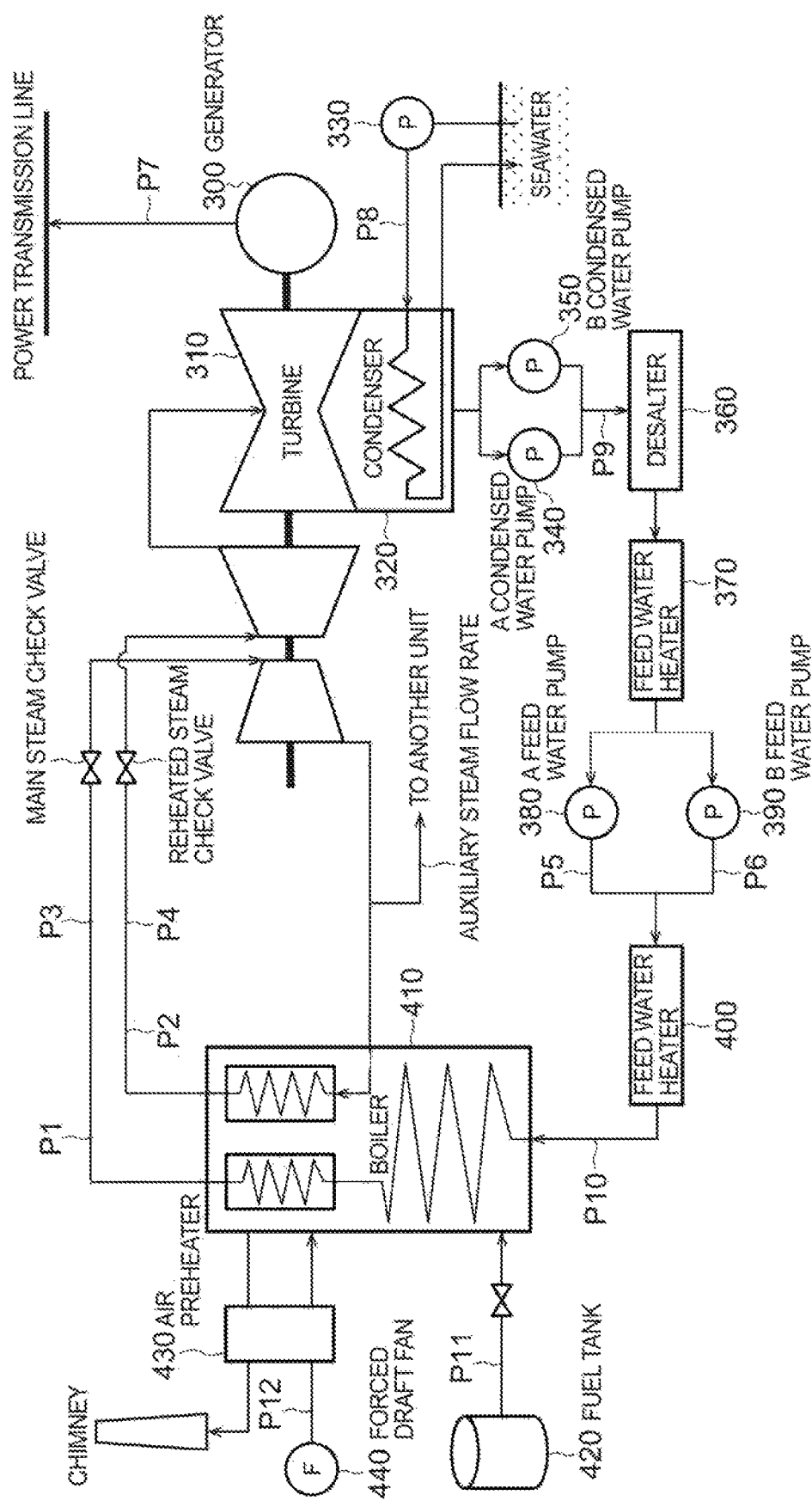
FIG. 1 is a diagram showing a configuration example of a plant.

FIG. 1 is a diagram showing a configuration example of a plant 2. First, the configuration example of the plant 2 and a point are explained. The point is, for example, a process amount input point (abbreviated as PID) where a process amount indicating a state of a monitoring target, in which the point is disposed, is acquired. For example, in the point, sensors for acquiring a process amount set as a monitoring target in the plant 2 are disposed.

In FIG. 1, a steam temperature of main steam heated by a boiler 410 is acquired by a sensor at a point P1. A main steam pressure is acquired by a sensor at a point P3. A steam temperature of reheated steam heated by the boiler 410 is acquired by a sensor at a point P2. A reheated steam pressure is acquired by a sensor at a point P4.

A generator 300 generates power according to rotation of a turbine 310 that rotates using energy of the main steam and the reheated steam. A power generation amount generated by the generator 300 is acquired by a sensor at a point P7. A cooling water temperature of a pump 330 that supplies cooling water to a condenser 320 is acquired by a sensor at a point P8. Flow rates of condensed water discharged from an A condensed water pump 340 and a B condensed water pump 350 connected in parallel to the condenser 320 are acquired by a sensor at a point P9.

The condensed water passed through a desalter 360 and a feed water heater 370 is supplied to a feed water heater 400 via an A feed water pump 380 and a B feed water pump 390. Feed water pump outlet pressures of the A feed water pump 380 and the B feed water pump 390 are respectively acquired by sensors at points P5 and P6.

A supplied water amount supplied to the boiler 410 via the feed water heater 400 is acquired by a sensor at a point P10. A fuel flow rate of a fuel tank 420 for supplying fuel to the boiler 410 is acquired by a sensor at a point P11. An air flow rate of a forced draft fan 440 that blows the air to an air preheater 430 is acquired by a sensor at a point P12.

Figure 2:
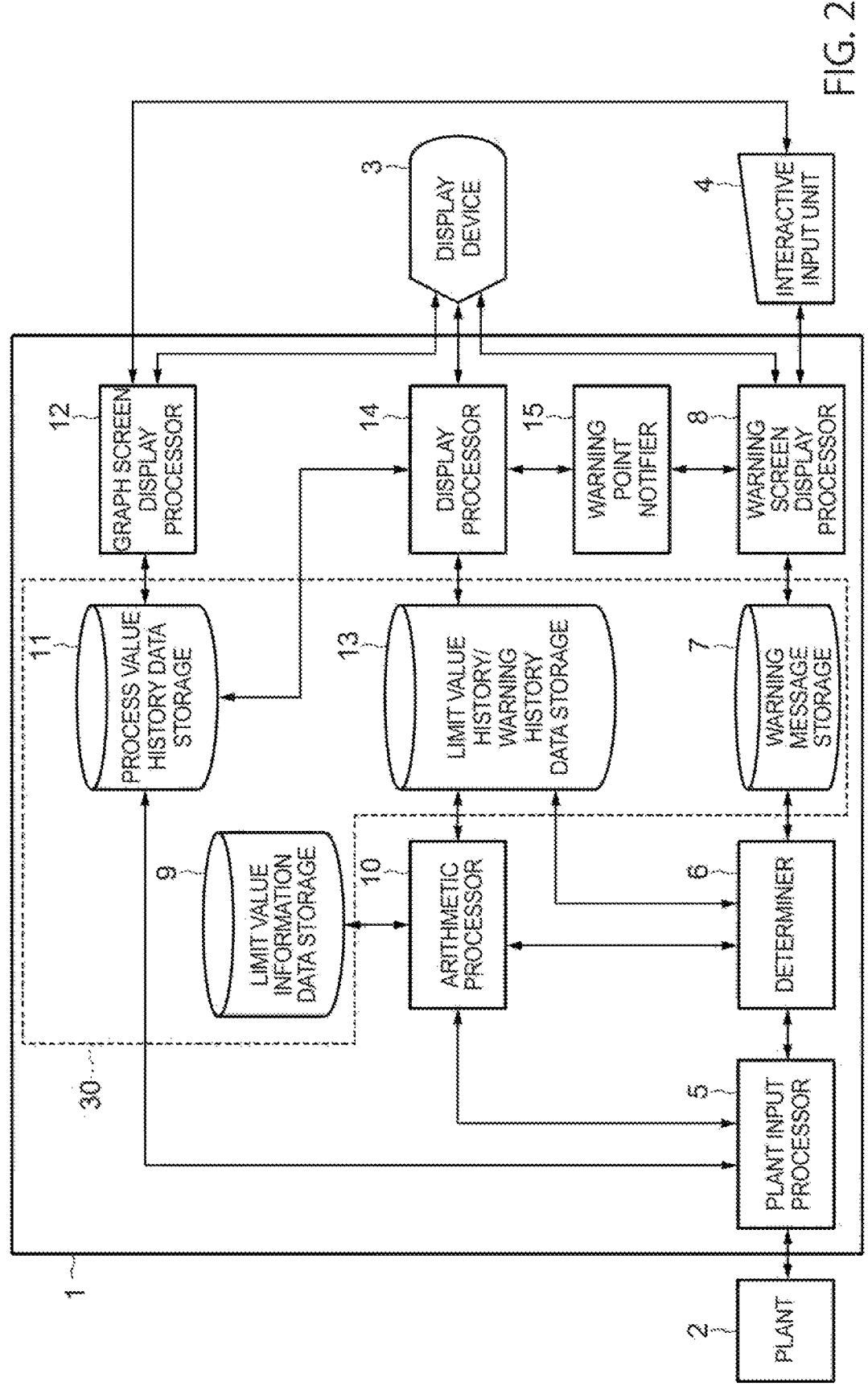
FIG. 2 is a block diagram showing a configuration example of a plant monitoring apparatus according to a first embodiment of the present invention.

FIG. 2 is a block diagram showing a configuration example of the plant monitoring apparatus 1 according to the first embodiment of the present invention. The plant monitoring apparatus 1 according to the embodiment includes a plant input processor 5, an arithmetic processor 10, a determiner 6, a warning screen display processor 8, a warning point notifier 15, a display processor 14, and a graph screen display processor 12.

(Plant-Input Processor 5)

First, the plant input processor 5 shown in FIG. 2 is explained. A storage 30 includes a warning message storage 7, a limit value information data storage 9, a process value history data storage 11, and a limit value history/warning history data storage 13.

The plant input processor 5 captures, as process amounts electric signals from, for example, sensors present at a plurality of points P1 to P12 in the plant 2. Subsequently, the plant input processor 5 processes, for example, using an EU calibration function, the process amount acquired from the plurality of points respectively into process values serving as engineering values. The plant input processor 5 causes the process value history data storage 11 in the storage 30 to store the processed process values. Consequently, the plant input processor 5 processes, for example, output values of the sensors or the like, which are sensitivity values, into values in physical units and stores the values in the storage 30. The plant input processor 5 outputs the processed process values to the arithmetic processor 10 and the determination processor 6.

The plant input processor 5 may be disposed in the points. Therefore, signals obtained on the basis of outputs from the points are set as process values.

FIG. 3 is a diagram illustrating a data format of process values stored in the process value history data storage 11 in the storage 30. The plant input processor 5 causes the process value history data storage 11 in the storage 30 to store, in time series, point names of a plurality of points (hereinafter sometimes referred to as "PIDs") and process values serving as data having date and times including times when the data is processed. Point names such as TAG123, TAG234, TAG815, TAG496, TAG755, TAG524, and TAG462 are respectively associated with the plurality of points P1 to P12.

(Arithmetic Processor 10)

Referring back to FIG. 2, the arithmetic processor 10 is explained. The arithmetic processor 10 calculates, on the basis of limit value information stored in the limit value information data storage 9, limit values respectively corresponding to a plurality of process values. Information concerning fixed values used as the limit values and information concerning process values and functions used when the limit values are variable values are stored in the limit value information data storage 9 in the storage 30 as the limit value information.

Figure 4:
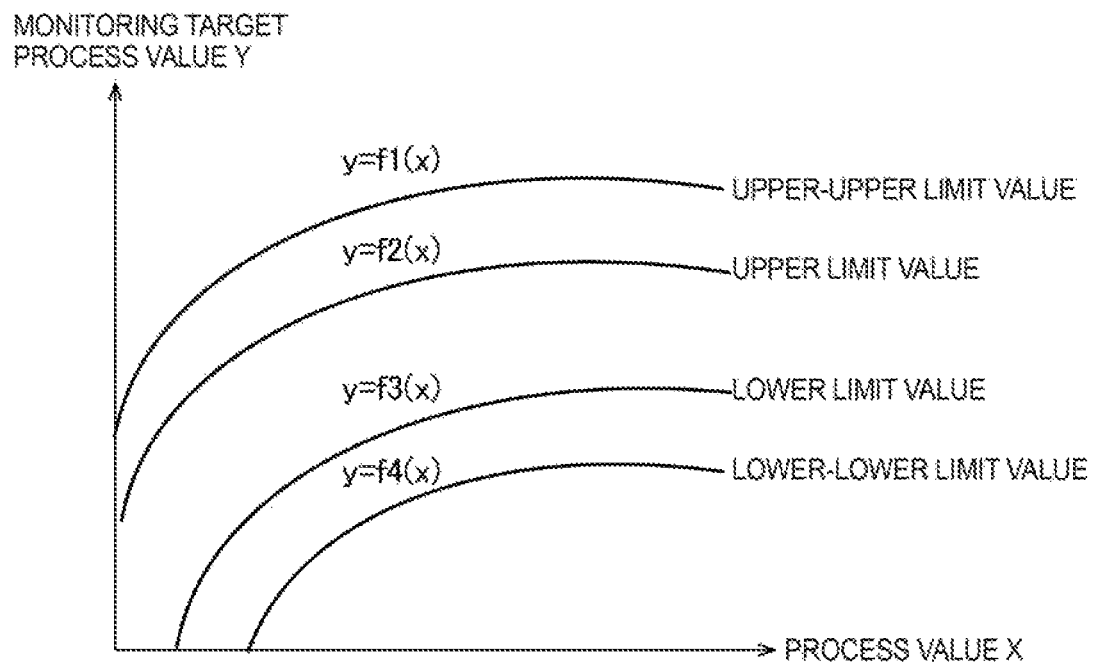
FIG. 4 is a diagram illustrating limit values in the case of one parameter.

Limit values are explained. FIG. 4 is a diagram illustrating limit values in the case of one parameter.

The arithmetic processor 10 is a processor that calculates limit values such as an upper-upper limit value, an upper limit value, a lower limit value, and a lower-lower limit value with respect to process values of respective monitoring targets in the plant 2. The arithmetic processor 10 calculates, as a limit value, for example, at least one of the upper limit value, the lower limit value having a value smaller than the upper limit value, the upper-upper limit value having a value larger than the upper limit value, and the lower-lower limit value having a value smaller than the lower limit value. For example, with respect to a process value (e.g., a first process value) Y acquired from a point in the plant 2 set as a monitoring target, a process value (e.g., a second process value) obtained from another point in the plant 2 is set as a parameter X.

In this case, for example, the upper-upper limit value is represented by Y=F1(X). F1 is a function represented by a polynomial, a polygonal line, or the like. Similarly, the upper limit value is represented by Y=F2(X), the lower limit value is represented by Y=F3(X), and the lower-lower limit value is represented by Y=F4(X). The arithmetic processor 10 calculates the limit value Y in time series on the basis of the process value X obtained in time series.

For example, if a limit value is a fixed value, the arithmetic processor 10 outputs the fixed value to the determiner 6. If the limit value is a variable value to be calculated, the arithmetic processor 10 acquires, for example, the process value X for calculating the variable value from the plant input processor 5. Subsequently, the arithmetic processor 10 calculates a limit value from the process value X using a function and outputs the limit value to the determiner 6. In this case, for example, the arithmetic processor 10 may acquire the process value X from the storage 30.

FIG. 4 illustrates the limit values in the case of the one parameter. However, the number of parameters is not always limited to one. The monitoring targets may be monitored using a plurality of parameters.

Figure 5:
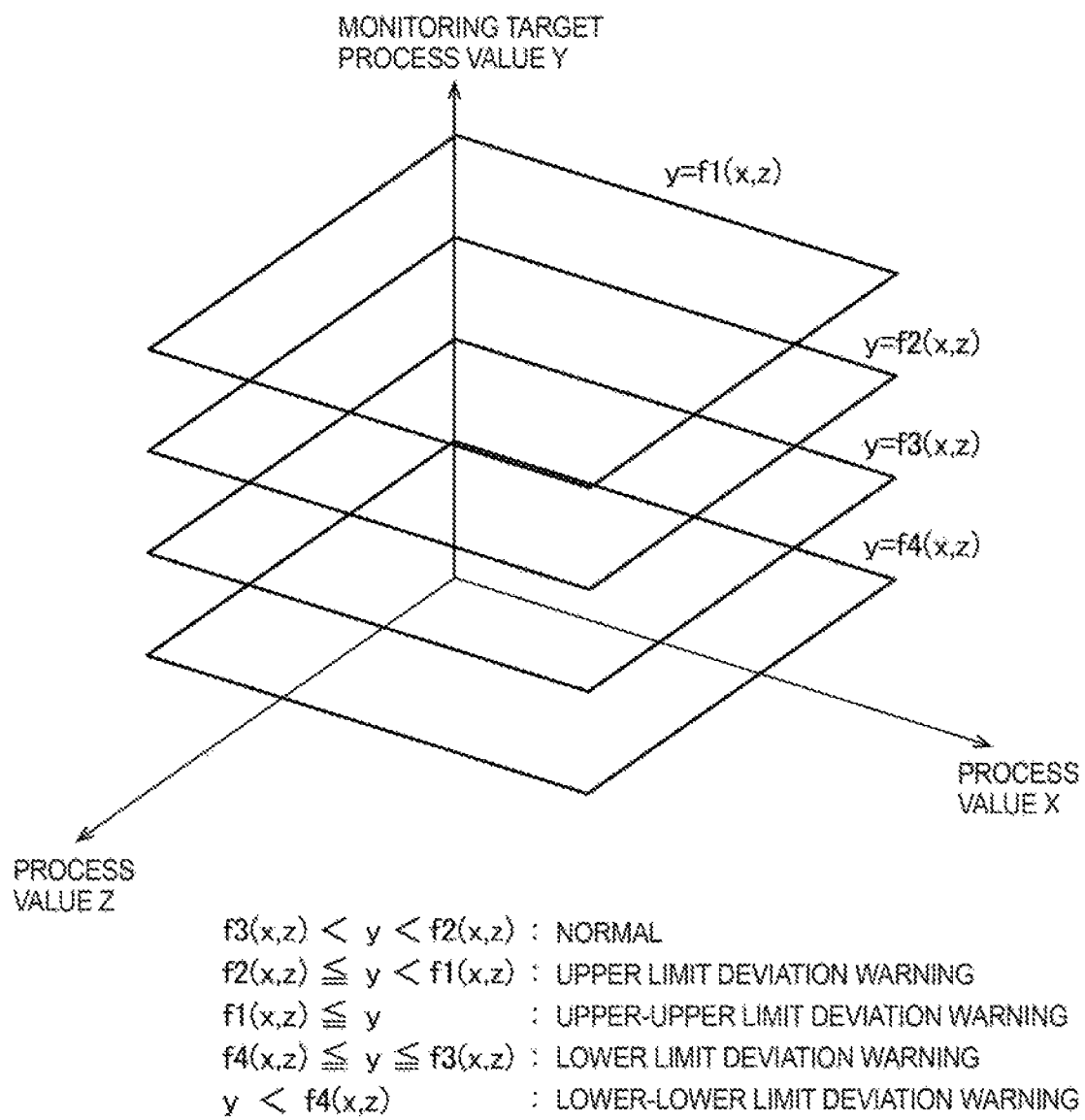
FIG. 5 is a diagram illustrating limit values in the case of two parameters.

FIG. 5 is a diagram illustrating limit values in the case of two parameters. For example, the limit values are functions having two process values X and Z as parameters like Y=F1(X, Z).

FIG. 6 is a diagram illustrating limit value data, which are limit value information, stored in the limit value information data storage 9 in the storage 30. The limit value information is information for associating, for each of a plurality of process values, either one of Information concerning at least one process value (e.g., X-PID and Z-PID) used when a limit value is calculated as a variable value and information concerning a fixed value (e.g., a fixed value 330 within a limit value field) used as a limit value.

As shown in FIG. 6, it is defined in a description in the limit value field, for each of tag names (descriptions in a Y-PID field) indicating process values, whether a limit value is a variable type (e.g., CRV123) or a fixed value (e.g., 330). It is defined for each of process values, as curve data, a function format used by the arithmetic processor 10. In this way, limit value information can be defined for each of process values. Therefore, it is possible to perform arithmetic processing matching the process value. For example, the arithmetic processor 10 calculates, on the basis of the limit value information, limit values respectively corresponding to a plurality of process values and causes the limit value history/warning history data storage 13 in the storage 30 to store the limit values in time series.

(Determiner 6)

Referring back to FIG. 2 again, the determiner 6 is explained. The determiner 6 compares, for example, the process value Y of the monitoring target and the limit values. Consequently, the determiner 6 determines whether the process value Y of the monitoring target exceeds and deviates from the limit values in a direction for deviating from the limit values. The determiner 6 determines whether the process value Y of the monitoring target exceeds the limit values in a direction for not deviating from the limit values and recovers from a state in which the process value Y deviates from the limit values to a state in which the process value Y does not deviate from the limit values.

For example, the determiner 6 compares the process value Y of the monitoring target of the plant 2 and values of the limit values to determine a warning state as a plurality of states according to a logic described below.

$F3(X) < Y < F2(X)$: Normal
$F2(X) \leq Y < F1(X)$: Upper limit deviation warning
$F1(X) \leq Y$: Upper-upper limit deviation warning
$F4(X) < Y \leq F3(X)$: Lower limit deviation warning
$Y \leq F4(X)$: Lower-lower limit deviation warning In this way, the determiner 6 determines a state in which the process value Y of the monitoring target is smaller than the upper limit value and larger than the lower limit value as a normal state (0), determines a state in which the process value Y of the monitoring target is smaller than the upper-upper limit value and equal to or larger than the upper limit value as an upper limit deviation state (1), determines a state in which the process value Y of the monitoring target is equal to or larger than the upper-upper limit value as an upper-upper limit deviation state (2), determines a state in which the process value Y of the monitoring target is larger than the lower-lower limit value and equal to or smaller than the lower limit value as a lower limit deviation state (−1), and determines a state in which the process value Y of the monitoring target is equal to or smaller than the lower-lower limit value as a lower-lower limit deviation state (−2). The determiner 6 does not need to use all the limit values for the determination and may use, for example, only the upper limit value for the determination.

For example, the determiner 6 causes the limit value history/warning history data storage 13 to store, in time series the determined warning states as numerical values (−2, −1, 0, 1, and 2 described above). For example, the numerical values stored in the storage 30 are displayed on a display of a display device 3 in time series. Consequently, a user (an operator) can grasp whether the plant is normal or in the upper limit deviation warning state, the upper-upper limit deviation warning state, the lower limit deviation warning state, or the lower-lower limit deviation warning state.

In this way, the determiner 6 determines, for example, a time when the process value Y of the monitoring target exceeds the limit value (the upper limit value or the lower limit value) corresponding to the process value Y as a point in time when the process value Y exceeds and deviates from the limit value. This is equivalent to a time when the state changes from the normal state (0) to the upper limit deviation state (1) or the lower limit deviation state (−1).

For example, the determiner 6 determines a point in time when the process value Y of the monitoring target recovers from a state in which the process value Y exceeds and deviates from the limit value (the upper limit value or the lower limit value) corresponding to the process value Y to a state in which the process value Y does not exceed and deviate from the limit value (the upper limit value or the lower limit value). This is equivalent to a time when the state changes from the upper limit deviation state (1) or the lower limit deviation state (−1) to the normal state (0).

Similarly, the determiner 6 determines, for example, a time when the process value Y of the monitoring target exceeds the limit value (the upper-upper limit value or the lower-lower limit value) corresponding to the process value Y as a point in time when the process value Y exceeds and deviates from the limit value. This is equivalent to a time when the state changes from the upper limit deviation state (1) to the upper-upper limit deviation state (2) or a time when the state changes from the lower limit deviation state (−1) to the lower-lower limit deviation state (−2).

For example, the determiner 6 determines a point in time when the process value Y of the monitoring target recovers from the state in which the process value Y exceeds and deviates from the limit value (the upper-upper limit value or the lower-lower limit value) to the state in which the process value Y does not exceed and deviate from the limit value (the upper-upper limit value or the lower-lower limit value). This is equivalent to a time when the state changes from the upper-upper limit deviation state (2) to the upper limit deviation state (2) or a time when the state changes from the lower-lower limit deviation state (−2) to the lower-lower limit deviation state (−1).

For example, the determiner 6 may compare the process value Y of the monitoring target and the limit values obtained by the arithmetic processor 10 and acquire time when any one state among the normal state, the upper limit deviation state, the upper-upper limit deviation state, the lower limit deviation state, and the lower-lower limit deviation state changes. In this case, for example, a change of the state in a direction in which the state worsens is referred to as "occurrence" and a change of the state in a direction in which the state improves is referred to as "recovery". For example, time of the occurrence is referred to as occurrence time and time when time of the recovery is referred to as recovery time.

The determiner 6 may monitor a plurality of process values Y. For example, the determiner 6 compares any one of the plurality of process values Y and the limit values corresponding to the process values Y to determine whether the any one of the plurality of process values Y deviates from the limit value corresponding to the process value Y or recovers from a state in which the process value Y deviates from the limit value to a state in which the process value Y does not deviate from the limit value.

FIG. 7 is an example of data stored in the limit value history/warning history data storage 13 in the storage 30. As shown in FIG. 7, for example, the arithmetic processor 10 causes the limit value history/warning history data storage 13 to store, in time series, limit values calculated at every moment by the arithmetic processor 10 according to a process value (e.g., TAG123).

As shown in FIG. 7, for example, the determiner 6 causes the limit value history/warning history data storage 13 to store, in association with the process value, in time series, a warning state determined at every moment. Among the data stored in the limit value history/warning history data storage 13, the warning state may be stored as 1 if the process value exceeds the warning limit value and may be stored as 0 otherwise.

For example, in the case of a process value having a plurality of warning states (e.g., the upper limit deviation state, the upper-upper limit deviation state, the lower limit deviation state, and the lower-lower limit deviation state), for each of the warning states, the arithmetic processor 10 may cause the limit value history/warning history data storage 13 to store a value 1 If the process value exceeds the warning limit value and store a value 0 otherwise in association with the process value. The warning state may also be stored as 0 in the normal state, stored as 1 In the upper limit deviation state, stored as 2 in the upper-upper limit deviation state, stored as −1 in the lower limit deviation state, and stored as −2 in the lower-lower limit deviation state, as described above.

In the former case, in order to display the values of the warning states in time series, a plurality of display curves are necessary because 0 and 1 are displayed for each of the warning states. On the other hand, in the latter case, for example, the warning state is displayed in time series using the numerical values −2, −1, 0, 1, and 2 indicating the states. Therefore, the warning state can be represented by one curve.

In this way, for example, the determiner 6 compares the process value Y of the monitoring target input from the plant input processor 5 and the limit values obtained by the arithmetic processor 10. The determiner 6 determines, for example, presence or absence of the warning occurrence and the warning recovery on the basis of a comparison result. For example, when there is a change of the occurrence/the recovery, the determiner 6 stores the change in the warning message storage 7 in the storage 30 in association with time when the change occurs.

Subsequently, the determiner 6 generates, for example, a warning message including occurrence time when the process value exceeds and deviates from the limit value, information concerning a point used to obtain the process value determined as deviating, and an occurrence message. The determiner 6 generates, for example, a warning message including recovery time when the process value recovers from a state in which the process value deviates from the limit value to a state in which the process value does not deviate from the limit value, information concerning a point used to obtain the process value determined as recovering to the state in which the process value does not deviate from the limit value, and a recovery message. For example, the determiner 6 causes the warning message storage 7 in the storage 30 to store the warning messages as warning occurrence data.

FIG. 8 is a diagram showing an example of warning occurrence data stored in the warning message storage 7. As illustrated in FIG. 8, for example, the warning occurrence data is associated with a date and time including times (the occurrence time and the recovery time), a point (PID), a message of occurrence or recovery, information concerning the limit value, and information concerning the warning state.

(Warning Screen Display Processor 8)

Referring back to FIG. 2 again, the warning screen display processor 8 is explained. The warning screen display processor 8 causes, for example, using the warning occurrence data stored in the warning message storage 7, the display device 3 to display a warning screen 18 on which warning messages are listed in time series in the order of generation.

For example, when operation information input using an Interactive input unit 4 is a display request for a warning screen, the warning screen display processor 8 acquires the warning occurrence data from the warning message storage 7.

FIG. 9 is a diagram illustrating the warning screen 18. As illustrated in FIG. 9, the warning screen display processor 8 causes the display device 3 to display the warning screen 18 using the warning occurrence data. In this way, the warning screen display processor 8 displays, for example, the warning message including the point (PID) of the warning occurrence and a date and time including the time (one of the occurrence time and the recovery time).

(Warning Point Notifier 15)

Referring back to FIG. 2 again, the warning point notifier 15 functioning as a first notifier is explained. The interactive input unit 4 indicates at least one point out of points (PIDs) associated with a plurality of warning messages in the warning screen 18 displayed on the display device 3. Subsequently, the user depresses, for example, using the interactive input unit 4, a "graph display" button 21 shown in FIG. 9.

The warning point notifier 15 outputs, according to the depression of the "graph display" button 21, information concerning a point associated with a warning message (e.g., indicated by a gray belt) indicated out of the warning messages and information concerning limit values corresponding to the point to the display processor 14 as point information of a monitoring target. The display processor 14 causes the display device 3 to display, in time series, a process value obtained from the point of the monitoring target and limit values corresponding to the process value.

The warning messages and the "graph display" button 21 for instructing graph display are displayed in the warning screen 18 side by side. Therefore, it is possible to cause the display device 3 to perform the graph display without opening another screen. The warning point notifier 15 outputs the point associated with the indicated warning message to the display processor 14 as the point of the monitoring target. Therefore, the user can immediately cause the display device 3 to perform the graph display simply by pointing the warning message and depressing the "graph display" button 21. Consequently, in order to perform the graph display, it is unnecessary to display another screen. It is possible to efficiently perform the display.

(Display Processor 14)

The display processor 14 is explained. For example, the display processor 14 causes, according to the depression of the "graph display" button 21 shown in FIG. 9, the display device 3 to display a warning trend graph screen 22 shown in FIG. 10.

In this case, the display processor 14 acquires, using information concerning the input point of the monitoring target, in time series, a process value stored in the process value history data storage 11 in the storage 30. For example, the display processor 14 acquires, from the limit value history/warning history data storage 13 in the storage 30, a limit value corresponding to the input point of the monitoring target and a numerical value indicating a warning state.

For example, the display processor 14 acquires data in a predetermined time range from the storage 30 starting from time when the "graph display" button 21 shown in FIG. 9 is depressed. For example, the display processor 14 acquires, from the storage 30, data in a time range around time when the warning message is generated. Subsequently, the display processor 14 causes the display device 3 to display the acquired data.

Figure 10:
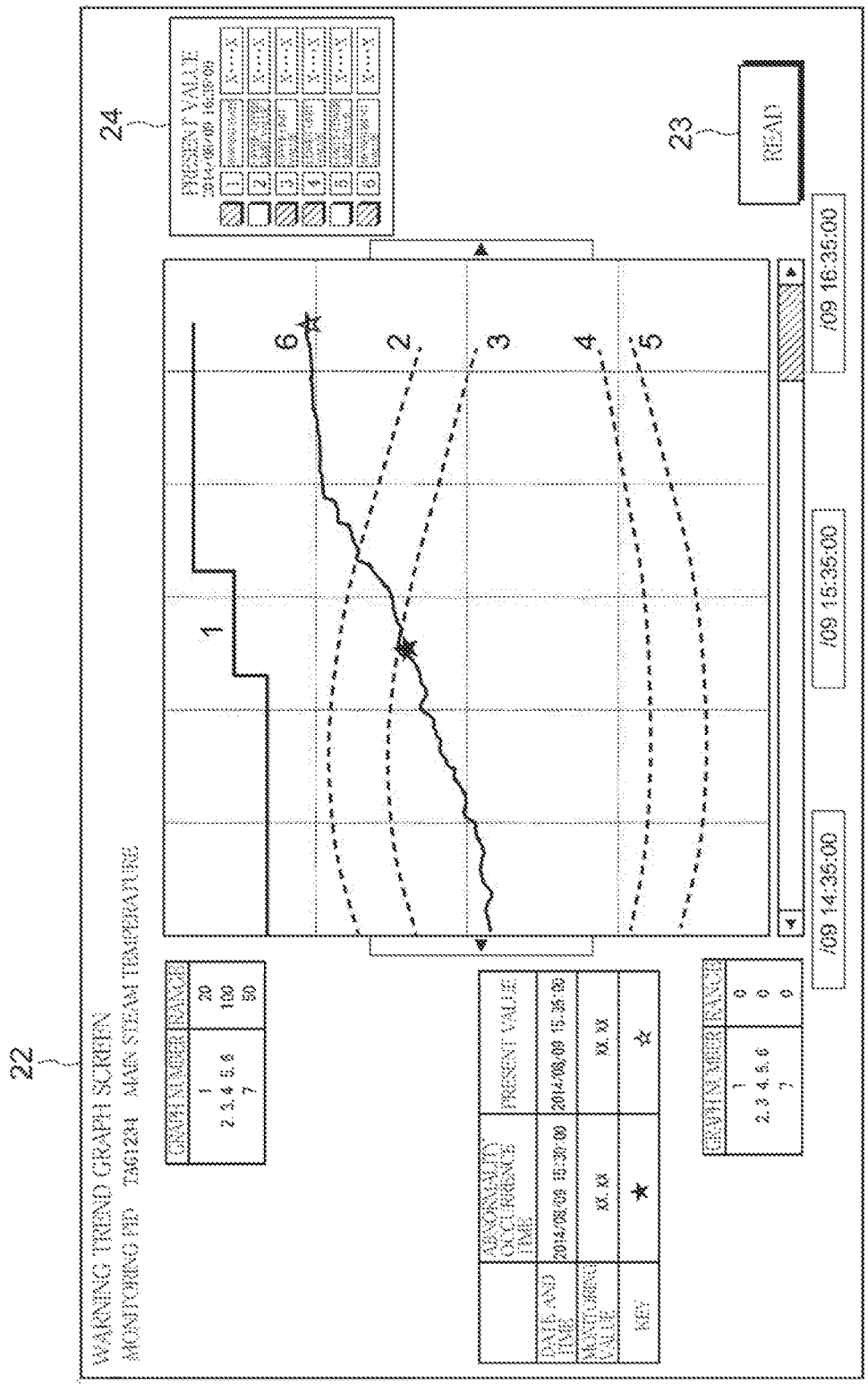
FIG. 10 is a diagram showing an example of a warning trend graph screen.

FIG. 10 is a diagram showing an example of a warning trend graph in which a process value, a warning state, and limit values are displayed in time series. As shown in FIG. 10, for example, the display processor 14 causes the display device 3 to display a warning trend graph in which a process value and limit values in a time range from warning occurrence to the present are displayed in time series.

A pen number 1 in FIG. 10 indicates a warning state. Pen numbers 2, 3, 4, and 5 indicate transitions of upper-upper limit, upper limit, lower limit, and lower-lower limit values. A pen number 6 indicates a transition of a process value of a monitoring target. Note that, in the graph, common range setting is used for the pen numbers 2, 3, 4, 5, and 6 because determination is easier in the same range.

Figure 11:
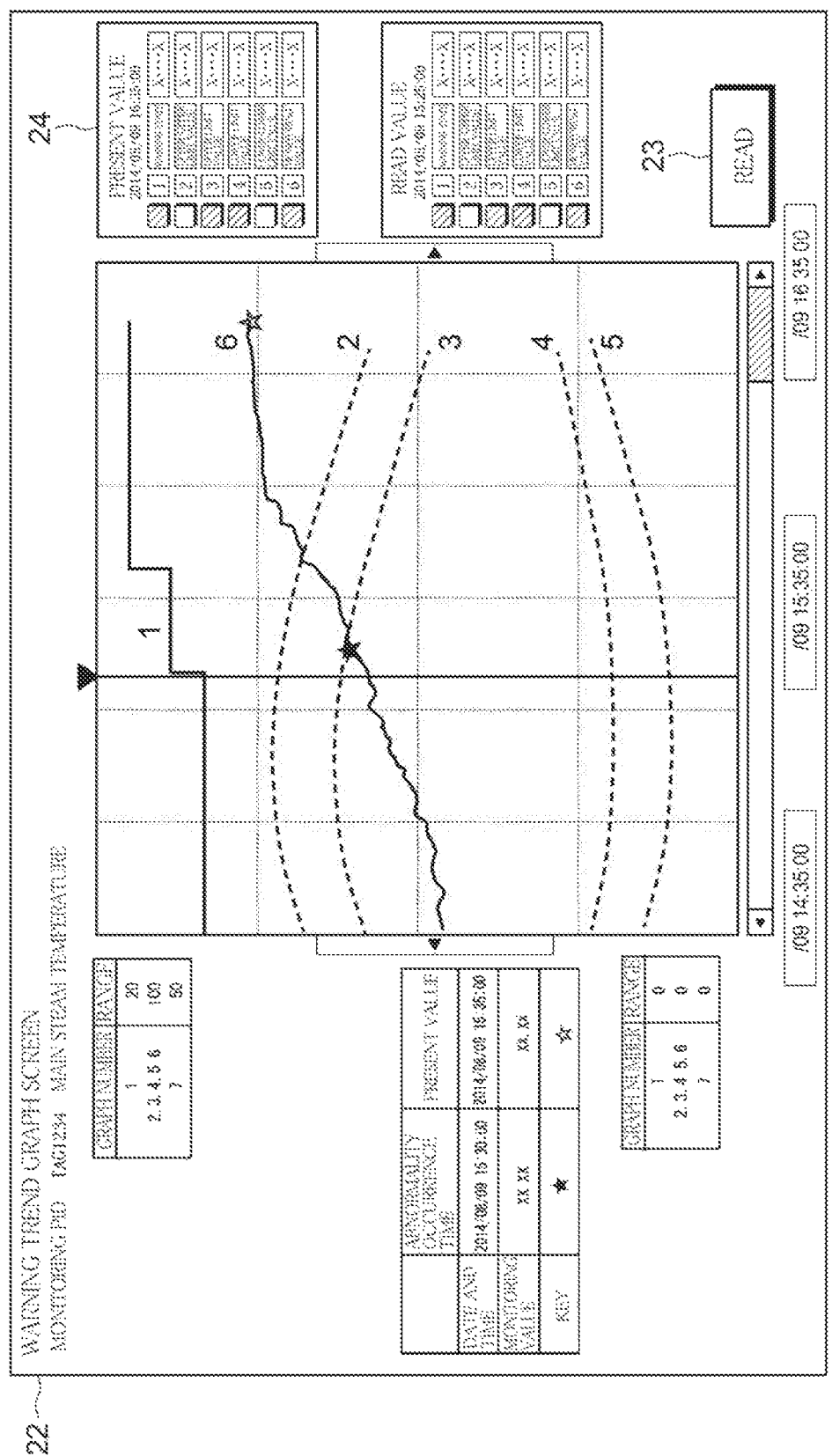
FIG. 11 is a diagram showing an example of a screen displayed by depression of a "read" button 23.

FIG. 11 is a diagram showing an example of a screen displayed by depression of a "read" button 23 shown in FIG. 10. As shown in FIG. 11, a cursor conforming to indication of the interactive input unit 4 may be displayed. Amounts at, a point in time of warning occurrence and the like may be read and displayed on the screen 22. Depending on a process value of a monitoring target, only the upper limit value is monitored as the limit value. In such a case, only the pen number 3 among the pen numbers 2, 3, 4, and 5 may be displayed. The pen numbers 2, 4, and 5 may be not displayed. For example, the display processor 14 acquires, from the process value history data storage 11, a process value necessary for graph display input from the interactive input unit 4.

(Graph Screen Display Processor 12)

Referring back to FIG. 2 again, for example, the graph screen display processor 12 outputs time series data of the process value to the display device 3 as screen data to cause the display device 3 to display a graph screen. In this case, the graph screen display processor 12 does not display time series data of the limit values. The graph screen display processor 12 receives a display request indication from the interactive input unit 4, causes the display device 3 to separately display a screen different from the warning screen 18, and instructs graph display.

In this way, according to the first embodiment, at least both of the process value and the limit values among the process value, the limit values, and the warning state are displayed in time series by selecting the warning message. Therefore, it is possible to improve convenience in warning monitoring of the operator.

Second Embodiment

Figure 12:
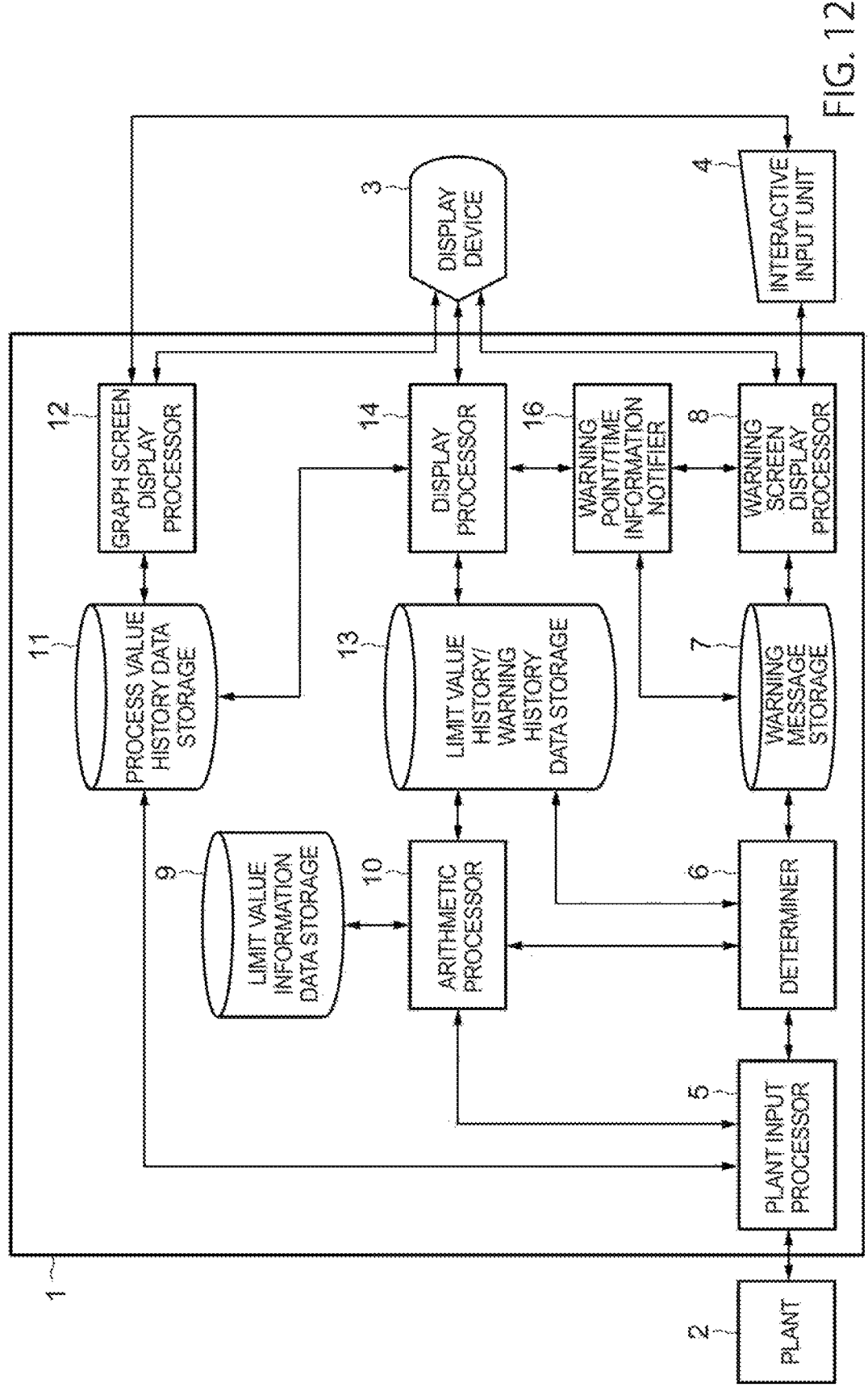
FIG. 12 is a block diagram showing a configuration example of a plant monitoring apparatus according to a second embodiment of the present invention.

FIG. 12 is a block diagram showing a configuration example of the plant monitoring apparatus 1 according to a second embodiment of the present invention. Components same as the components in the first embodiment are denoted by the same reference numerals and signs and explanation of the components is omitted. The plant monitoring apparatus 1 includes a warning point/time information notifier 16 instead or In addition to the warning point notifier 15 in the first embodiment.

Figure 13:
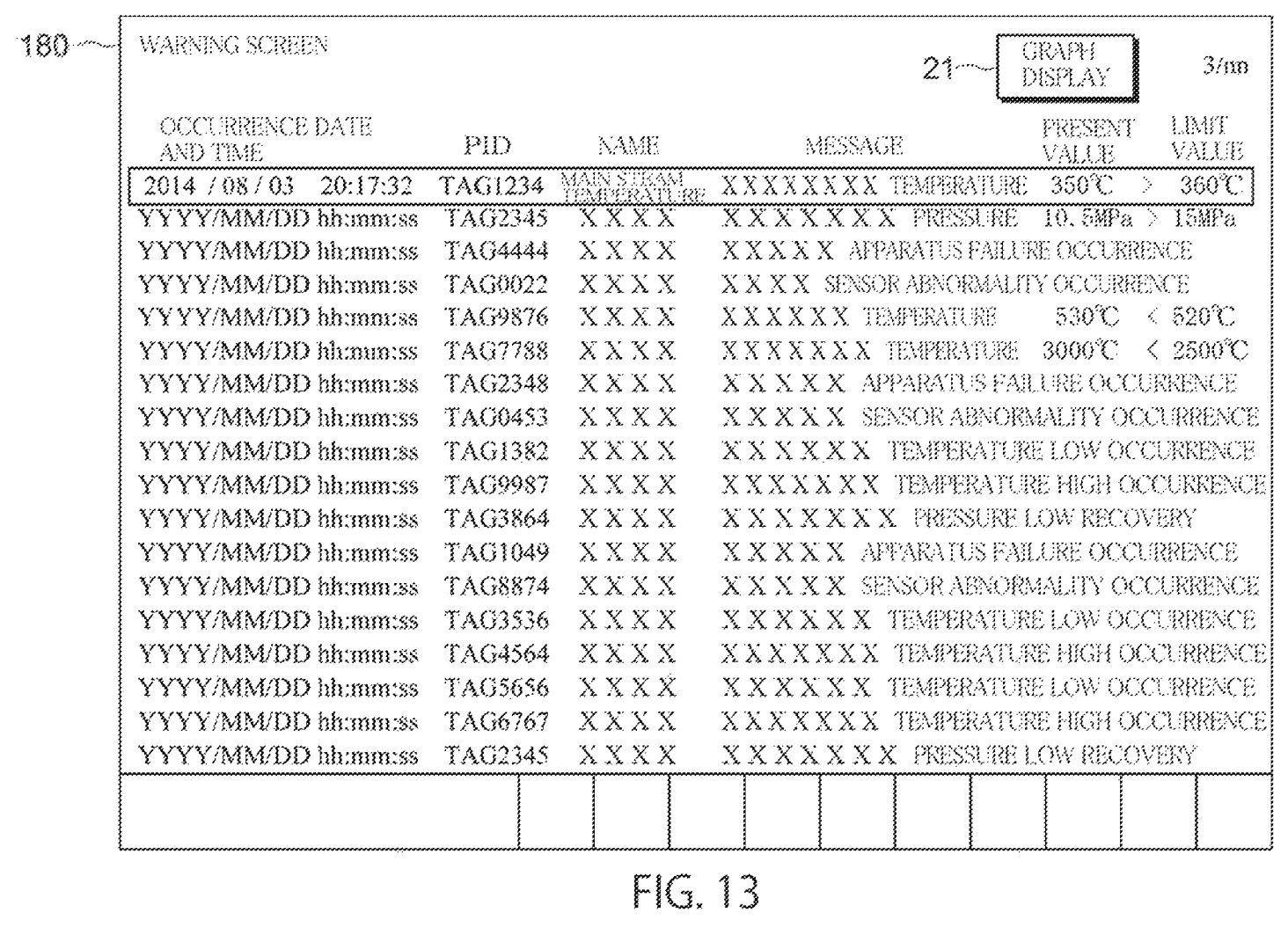

FIG. 13 is illustration of warning messages in a warning screen 180 that the warning screen display processor 8 causes the display device 3 to display. The warning screen 180 is, for example, a screen for displaying, in time series, warning messages generated in the past. The warning screen 180 is sometimes called warning history list screen. The interactive input unit 4 indicates at least one time out of times associated with a plurality of warning messages displayed on the display device 3.

The warning point/time information notifier 16 functioning as a second notifier outputs information concerning the indicated time to the display processor 14. In this case, for example, the display processor 14 causes the display device 3 to display, in time series, a process value and limit values within a predetermined time range including the times (occurrence time and recovery time) input from the warning point/time information notifier 16. In this way, for example, the display processor 14 uses, as a time when the process value exceeds the limit value, the time input from the warning point/time information notifier 16.

In this case, a time range in which graph display is performed may be decided in advance from the horizontal axis of a graph. The display processor 14 may cause, using a time range decided from the range of the horizontal axis of the graph, the display device 3 to display the process value and the limit values in time series. The predetermined time range may be set to, for example, a range from the time input from the warning point/time information notifier 16 to time when the "graph display" button 21 is depressed.

Among the warning messages shown in FIG. 13, ", , XXX occurs" is displayed in a message field. In some case, this warning message is designated from the interactive input unit 4 and recovery time corresponding to the warning message is present. In this case, the warning point/time information notifier 16 may search and acquire the corresponding recovery time from the warning message storage 7.

In this case, the warning point/time information notifier 16 searches and acquires, from the warning message storage 7, recovery time when a point associated with the warning message recovered after occurrence time. For example, in a message among the warning messages stored in the warning message storage 7, ", , XXX recovery" is described and recovery time and a point (PID) name are associated with the message. Therefore, for example, the warning point/time information notifier 16 acquires recovery time after the occurrence time from the warning message storage 7 using a text of "recovery", the recovery time, and the point (PID) name.

The warning point/time information notifier 16 calculates a range in which the occurrence time associated with the warning message and the acquired recovery time can be displayed in a graph for displaying a process value of a monitoring target in time series. In this case, the warning point/time information notifier 16 calculates start point time and end point time for searching through the process value history data storage 11. Subsequently, the warning point/time information notifier 16 outputs the start point time and the end point time to the display processor 14. When displaying the warning trend graph screen 22 on the display device 3, the display processor 14 acquires, from the warning point/time information notifier 16, not only information concerning a warning point of a monitoring target but also the start point time and the end point time serving as information based on time associated with the warning message.

In this way, the warning point/time information notifier 16 outputs, to the display processor 14, as the information based on the time associated with the warning message, at least one of the occurrence time, the recovery time, and the times (the start point time and the end point time) indicating a range including at least the occurrence time to the recovery time. Consequently, when the display processor 14 searches, from the storage 30, data that should be displayed, the display processor 14 may add the occurrence time, the recovery time, and one of the start point time and the end point time to a search key and execute the search. In this case, for example, when the start point time and the end point time are input from the warning point/time information notifier 16, the display processor 14 acquires, from the storage 30, in time series, a process value and limit values in a time range including at least the start point time and the end point time.

When one of the occurrence time and the recovery time is input, the display processor 14 acquires, from the storage 30, in time series, a process value and limit values in a time range including at least one of the occurrence time and the recovery time. In this case, for example, the display processor 14 causes the display device 3 to display, in time series, the process value and the limit values acquired from the storage 30.

Figure 14:
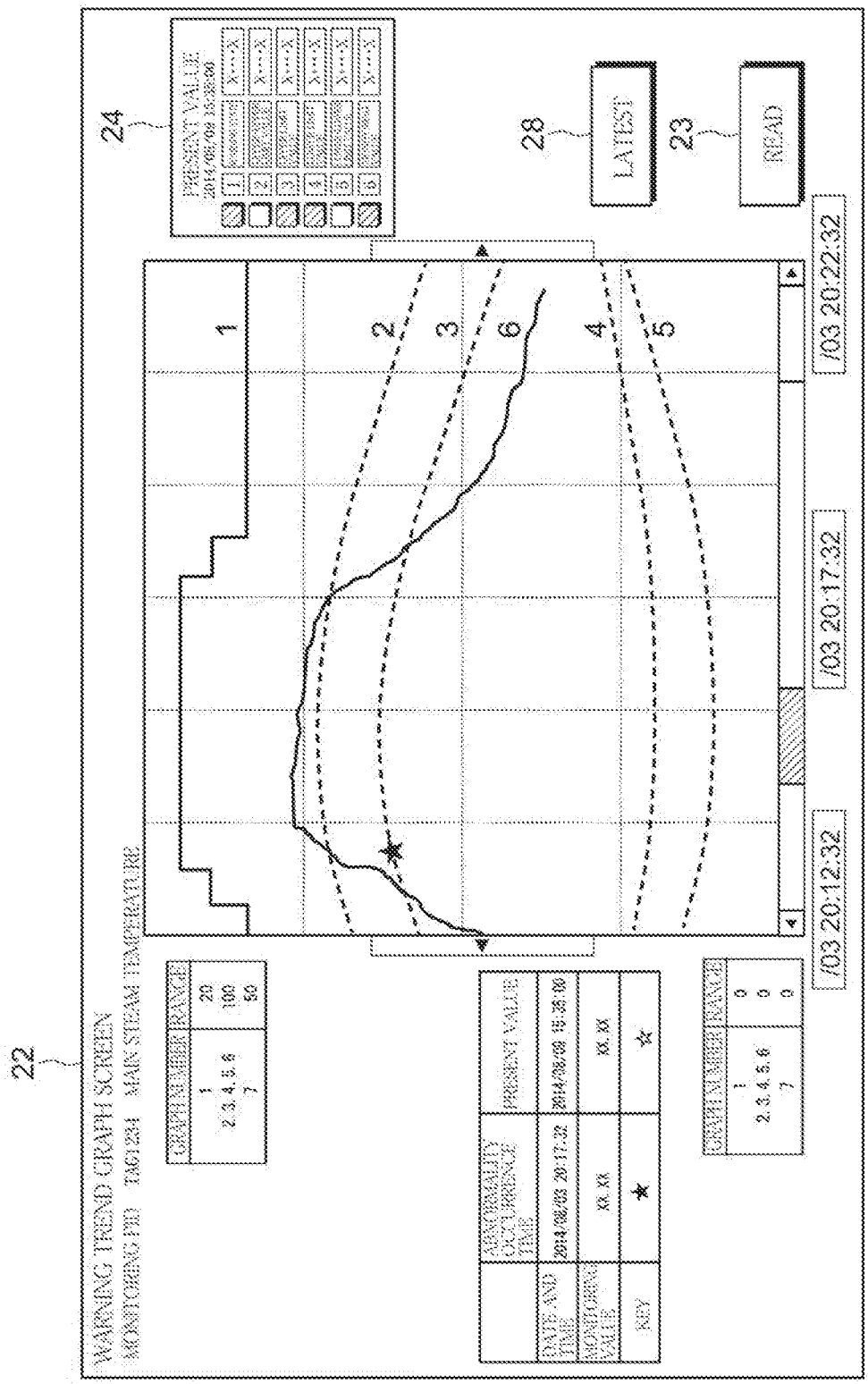
FIG. 14 is a diagram illustrating a warning trend graph screen including occurrence time and any recovery time.

FIG. 14 is a diagram illustrating the warning trend graph screen 22 including indicated occurrence time and any recovery time. By selecting the warning message as explained above, for example, as illustrated in FIG. 14, the display processor 14 is capable of causing the display device 3 to display the warning trend graph screen 22 including the indicated occurrence time and the any recovery time. The display processor 14 is also capable of transitioning, by displaying a "latest" button 28 on the screen, the warning trend graph screen 22 to the warning trend graph screen 22 at a point of a monitoring target at latest time when the button is depressed.

For example, when time associated with the warning message is indicated from the warning screen 18 on which a present warning state is displayed, the recovery time is often absent. Therefore, for example, as shown in FIG. 10, data in a predetermined time range from time (the present) when the "graph display" button 21 is depressed is often displayed. Therefore, when the time associated with the warning message is indicated from the warning screen 18, for example, the display processor 14 may be set in a first mode in which the recovery time is not searched.

On the other hand, for example, when time associated with the warning message is indicated from the warning history list screen 180 on which warning states in the past are displayed shown in FIG. 13, the recovery time is often present. Therefore, for example, as shown in FIG. 14, a range including at least the indicated time to the recovery time is often displayed. Therefore, for example, when the time associated with the warning message is indicated from the warning history list screen 180, for example, the display processor 14 may be set in a second mode in which the recovery time is searched.

In this way, as illustrated in FIG. 13, any warning message is indicated on the warning history list screen 180, on which the warning states in the past are displayed, using the interactive input unit 4. Subsequently, by depressing the "graph display" button 21 using the interactive input unit 4, it is also possible to cause the display device 3 to display the warning trend graph screen 22 of time associated with the warning message and the point of the monitoring target.

By indicating the warning message, for example, as illustrated in FIG. 14, the display processor 14 is capable of causing the display device 3 to display the warning trend graph screen 22 including the indicated occurrence time and the any recovery time.

With the plant monitoring apparatus 1 according to the embodiment, by indicating the warning message, it is possible to effectively display the process value using the time associated with the warning message. Consequently, it is possible to improve convenience in warning monitoring of an operator.

Third Embodiment

Figure 15:
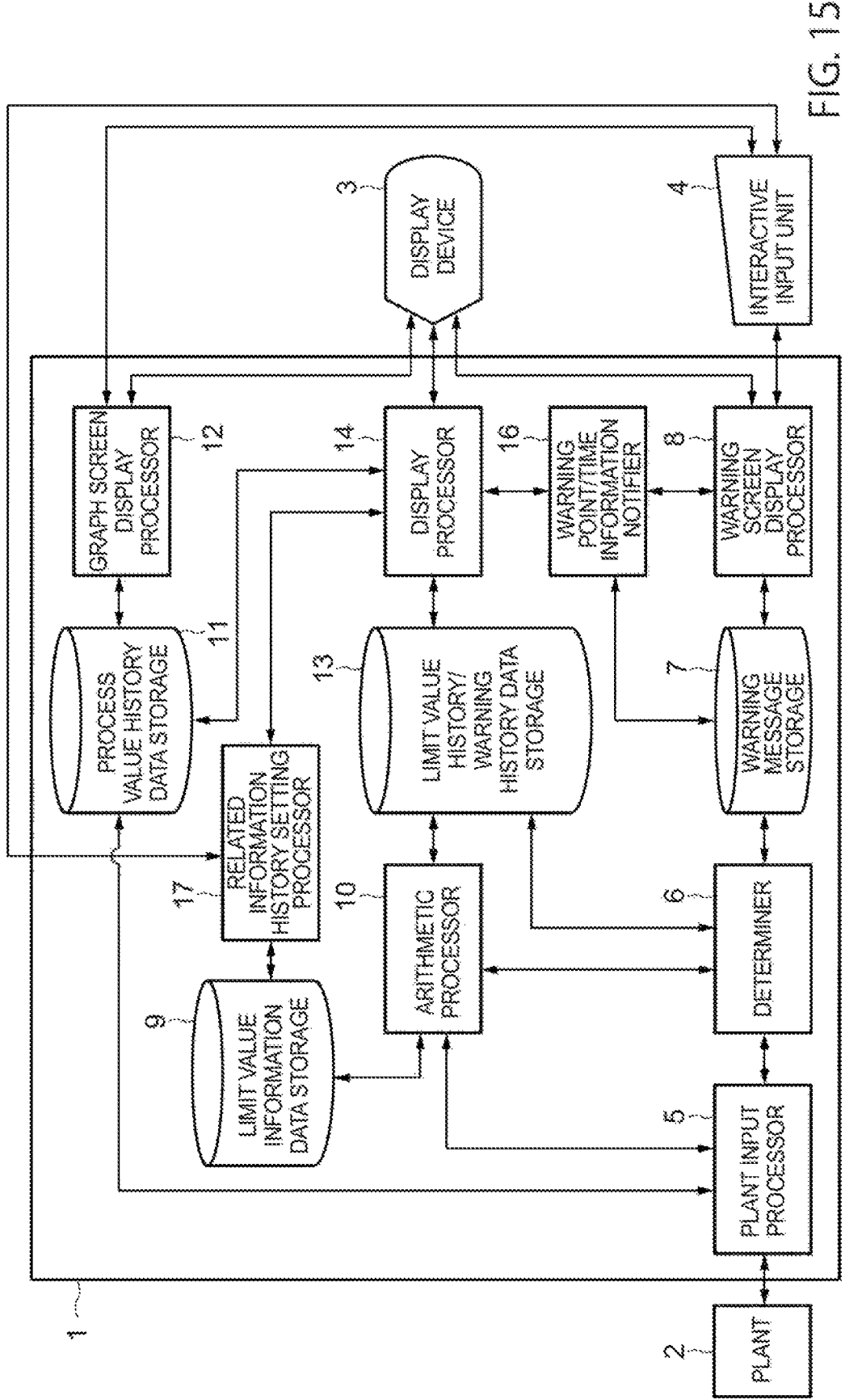
FIG. 15 is a block diagram showing a configuration example of a plant monitoring apparatus according to a third embodiment of the present invention.

A third embodiment of the present invention is explained with reference to FIG. 15. FIG. 15 is a block diagram showing a configuration example of the plant monitoring apparatus 1 according to the third embodiment of the present invention. Components same as the components in the second embodiment are denoted by the same reference numerals and signs and explanation of the components is omitted.

The plant monitoring apparatus 1 according to the third embodiment includes a related information history setting processor 17. The related information history setting processor 17 sets, using the interactive input unit 4, a point in the plant 2 as a related information history.

For example, the related information history setting processor 17 performs setting processing for displaying a process value of any point (PID) name on the warning trend graph screen 22.

Figure 16:
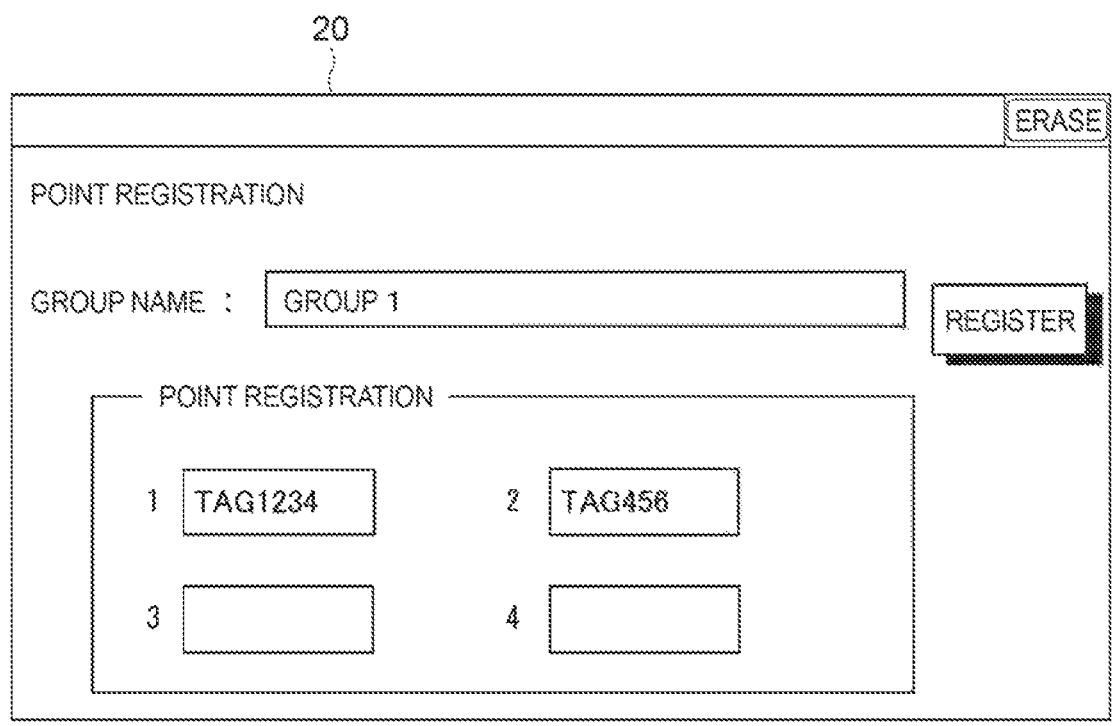
FIG. 16 is a diagram illustrating a registration screen.

FIG. 16 is a diagram illustrating a registration screen 20. As shown in the registration screen 20 in FIG. 16, for example, any point name (e.g., TAG456) desired to be displayed on the warning trend graph screen 22 is input together with a point (e.g., TAG1234) of a monitoring target using the interactive input unit 4.

The related information history setting processor 17 stores the input point name in the limit value information data storage 9 in the storage 30 as the related information history. The plant input processor 5 acquires a process amount of the point set as the related information history, processes the process amount as a process value, and stores the process value in the storage 30 in time series.

The display processor 14 causes the display device 3 to display, in time series, the process value corresponding to the set point together with the process value corresponding to the point stored in the storage 30 and limit values corresponding to the process value.

Figure 17:
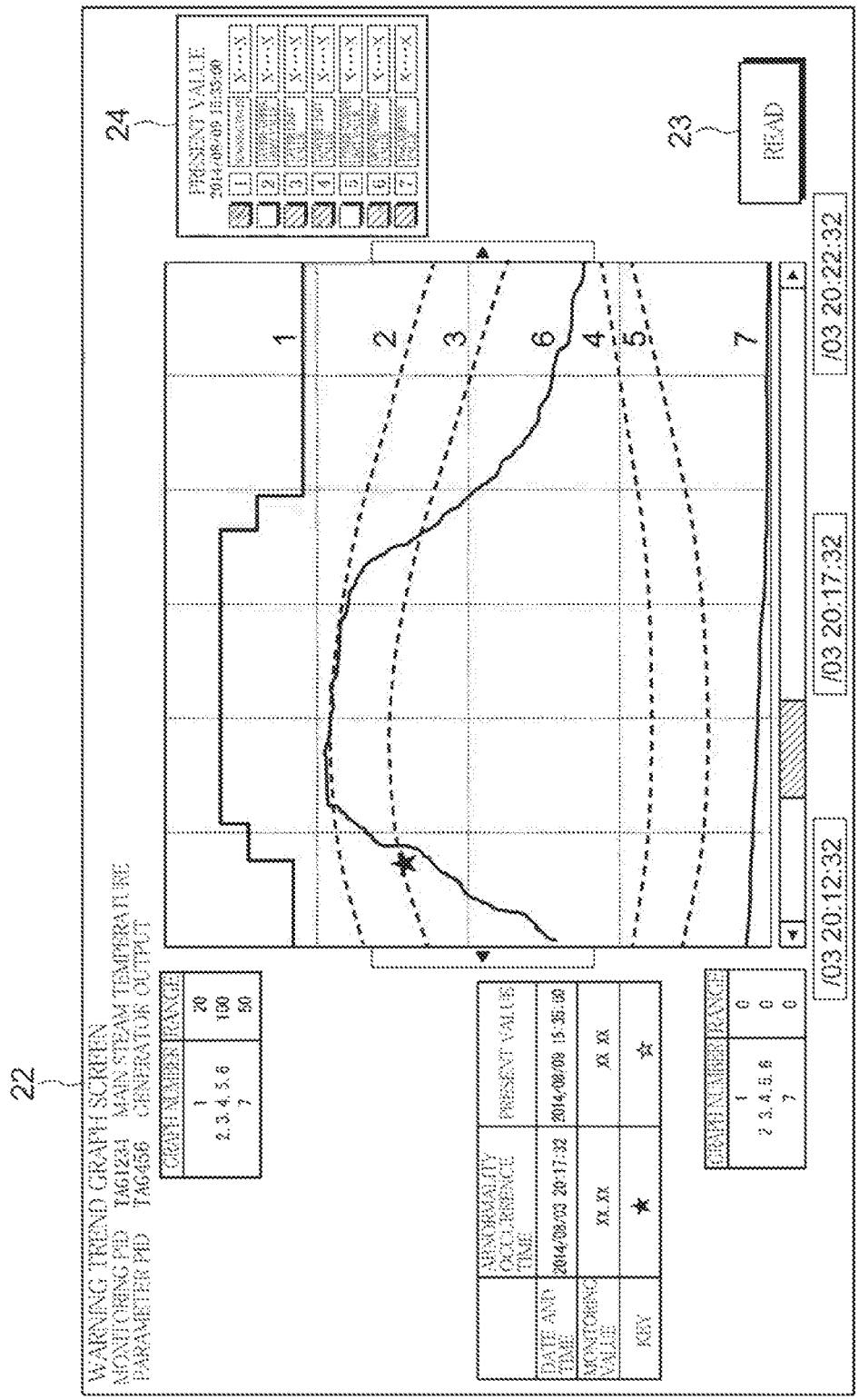
FIG. 17 is a diagram illustrating a warning trend graph screen.

FIG. 17 is a diagram illustrating warning trend graph screen 22. As explained above, the display processor 14 displays the process value of the point name (e.g., TAG456) indicated by the pen number 7 on the warning trend graph screen 22 as shown in FIG. 17. In this case, for example, the display processor 14 acquires the process value of an additional point name (e.g., TAG456) from the limit value information data storage 9 through the related information history setting processor 17. Consequently, the display processor 14 acquires time series data from the process value history data storage 11 using the point name (e.g., TAG456). Therefore, the display processor 14 can display, on the warning trend graph screen 22, a process value (sometimes referred to as parameter value as well) of any point name (e.g., TAG456) in addition to the point (e.g., TAG1234) of the monitoring target. In FIG. 16, as an example, the number of added points is one. However, a plurality of points may be added according to necessity.

In this way, a process value (a parameter value) of any point name (PID) can be additionally displayed on the warning trend graph screen 22. For example, in some case, the arithmetic processor 10 calculates limit values using process values (parameter values) of a plurality of points (PIDs) and the determination processor 6 processes a warning state. In this case, a process value (a parameter value) of a point name (PID) used for calculation by the arithmetic processor 10 may be concurrently displayed.

With the plant monitoring apparatus 1 according to the embodiment, a process value (a parameter value) of a point related to a point of a monitoring target can be concurrently displayed. Consequently, it is possible to easily grasp where a primary cause of occurrence of a warning state is present. Consequently, it is possible to improve convenience in warning monitoring of an operator.

Fourth Embodiment

Figure 18:
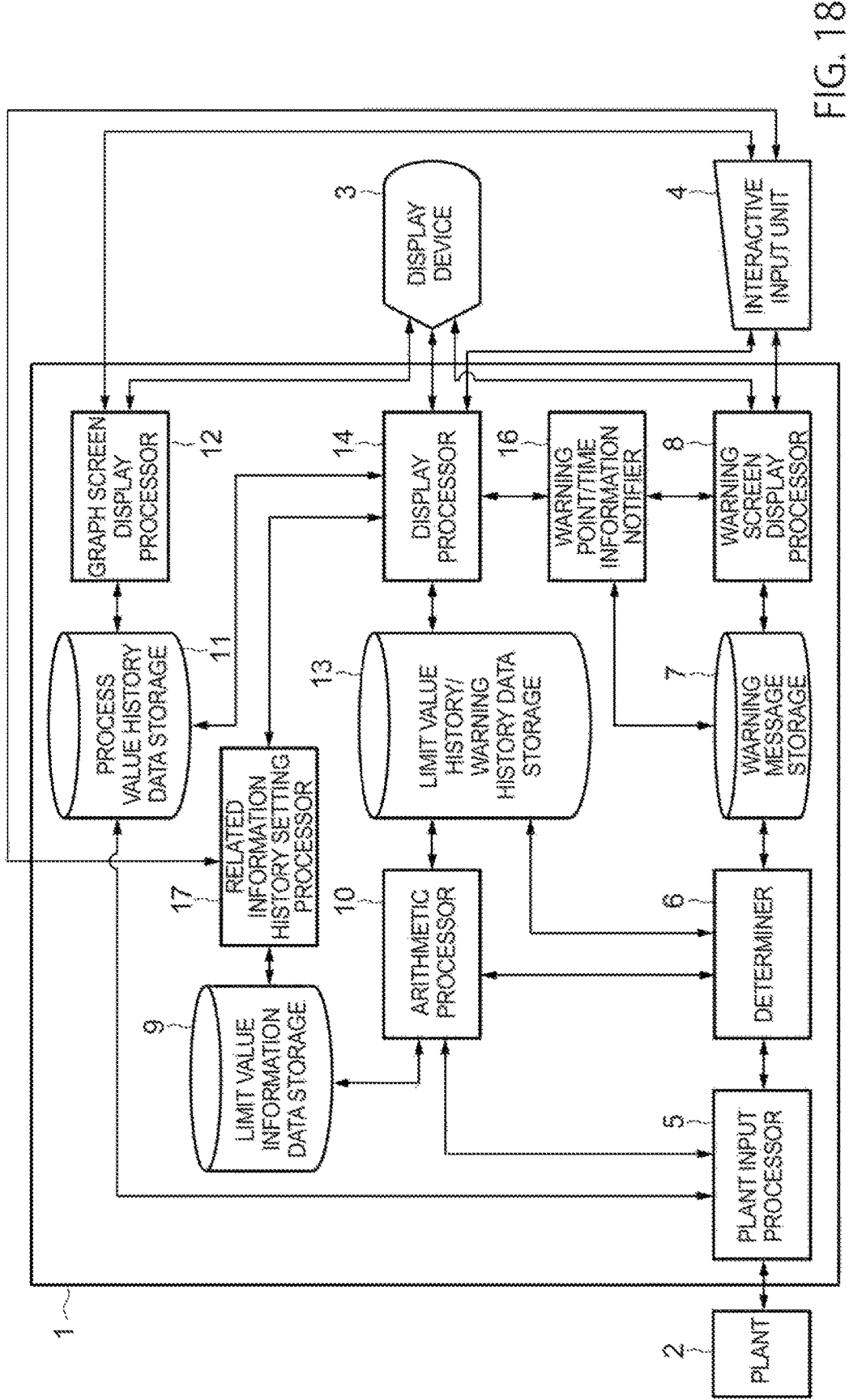
FIG. 18 is a block diagram showing a configuration example of a plant monitoring apparatus according to a fourth embodiment of the present invention.

A fourth embodiment of the present invention is explained with reference to FIG. 18. FIG. 18 is a block diagram showing a configuration example of the plant monitoring apparatus 1 according to the fourth embodiment of the present invention. Components same as the components in the third embodiment are denoted by the same reference numerals and signs and explanation of the components is omitted.

In the fourth embodiment of the present invention, a switching processing function for switching a graph type is further included in the display processor 14. The display processor 14 displays a time-series graph in which the horizontal axis indicates time and the vertical axis indicates a value of a process value obtained from a point of a monitoring target. The display processor 14 displays a correlation graph in which the vertical axis indicates a value of a first process value and the horizontal axis indicates a value of a process value obtained from a point used for calculating limit values.

A graph type switcher 140 (not shown in the figure) included in the display processor 14 switches, according to an instruction from the interactive input unit 4, display of a time-series graph and a correlation graph and causes the display device 3 to display the time-series graph and the correlation graph.

For example, the graph type switcher 140 causes the user to input a graph type change request from the interactive input unit 4. For example, the graph type switcher 140 acquires a point of a monitoring target related to a warning message designated in a warning message displayed by the warning screen display processor 8.

Subsequently, for example, the graph type switcher 140 acquires, from the process value history data storage 11, time series data of a process value obtained from the point of the monitoring target. For example, the graph type switcher 140 acquires limit values corresponding to the process value. The display processor 14 acquires a numerical value indicating a warning state from the limit value history/warning history data storage 13.

Figure 19:
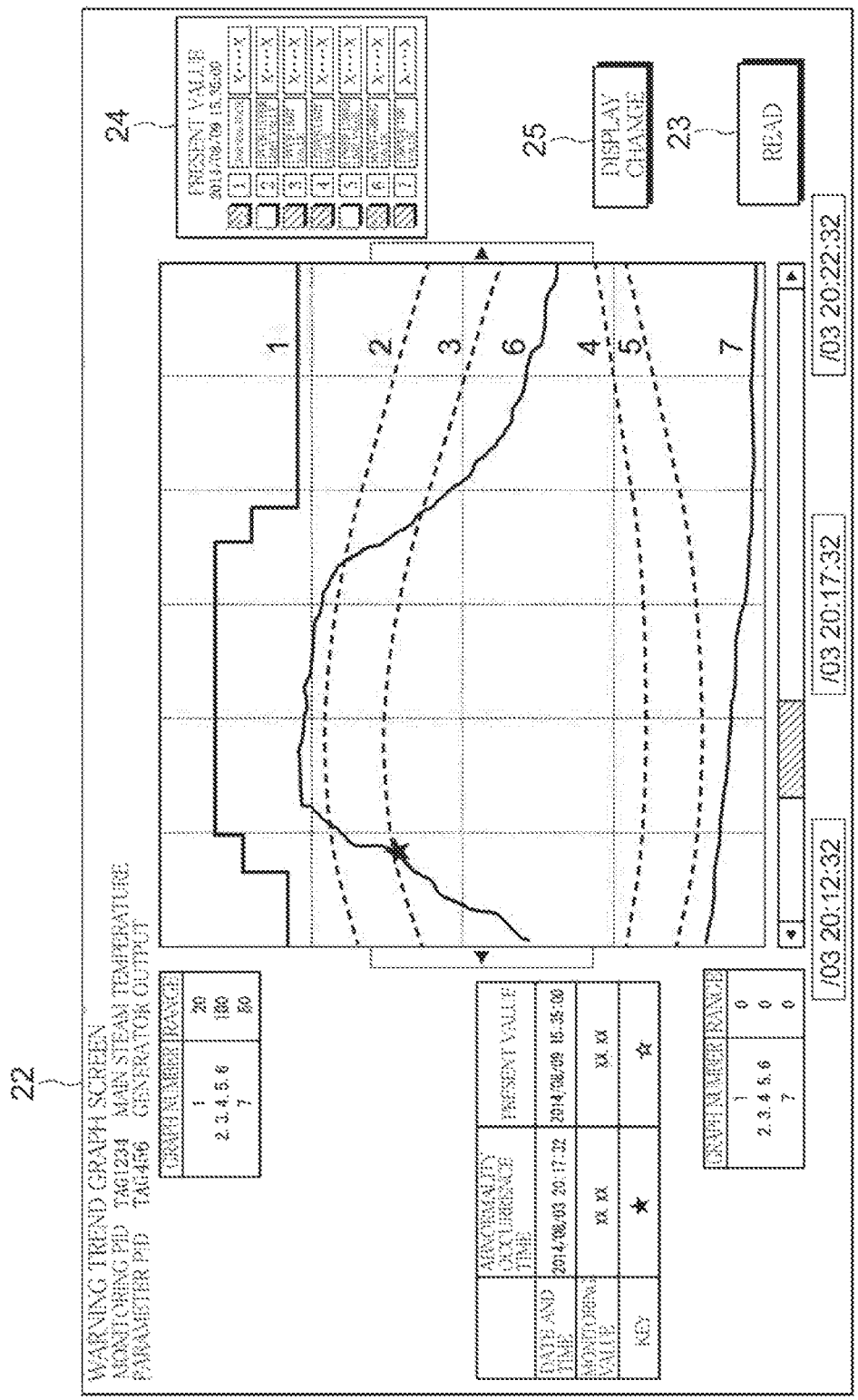
FIG. 19 is a diagram illustrating a time-series graph.

FIG. 19 is a diagram illustrating the time-series graph. For example, the graph type switcher 140 causes, using these acquired data, the display device 3 to display the time-series graph illustrated on the screen 22 shown in FIG. 19.

For example, the graph type switcher 140 causes the display device 3 to display a "display change" button 25 used for graph type display switching shown in FIG. 19.

The "display change" button 25 is depressed using the interactive input unit 4. A switch request from the time-series graph to the correlation graph is input to the graph type switcher 140. In this case, the display processor 14 acquires, from the process value history data storage 11, in time series, a process value (on an X axis) obtained from a point used for calculating limit values. In this case, for example, the display processor 14 acquires, from the process value history data storage 11, in time series, a second process value at a mesh, which is a time interval, for a period same as those for acquiring a process value (on a Y axis) in the time-series graph. For example, the graph type switcher 140 calculates a coordinate on the correlation graph from the process value on the X axis and the process value on the Y axis acquired at the same time.

Figure 20:
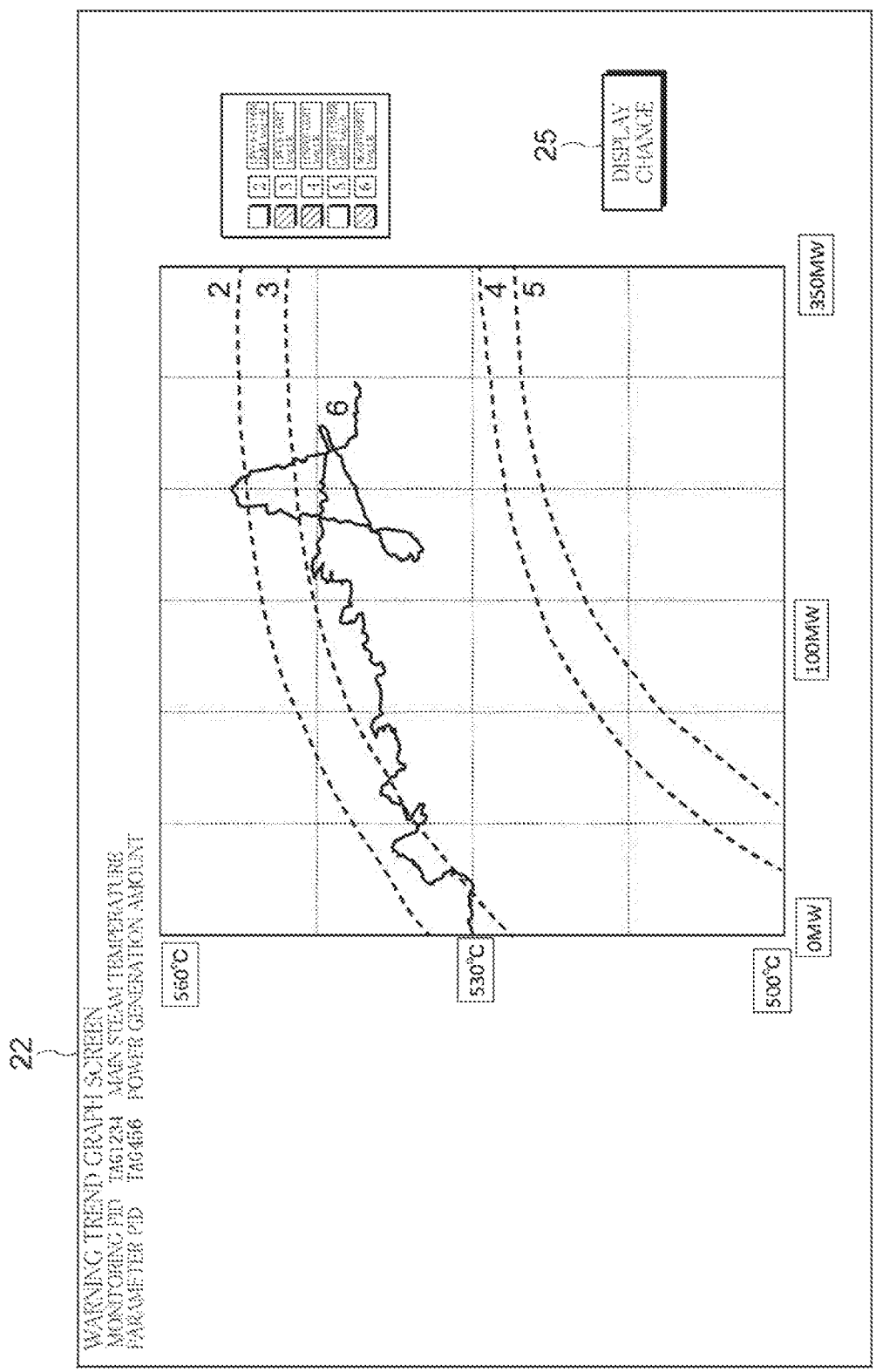
FIG. 20 is a diagram illustrating a correlation graph.

FIG. 20 is a diagram illustrating the correlation graph. Subsequently, the display processor 14 causes the display device 3 to display the calculated coordinate as the correlation graph on the screen 22 illustrated in FIG. 20 using a marker or a line.

The graph type switcher 140 causes the display device 3 to display values (the pen numbers 2, 3, 4, and 5) of the limit value curve functions Y=F1(X), Y=F2(X), Y=F3(X), and Y=F4(X) stored in the limit value information data storage 9, for example, on the screen 22 illustrated in FIG. 2.

When the value of the first process value exceeds the limit value, the graph type switcher 140 may change a relevant marker or line to a color or a shape that can be distinguished from other regions. Consequently, it is possible to improve an identification property of a region exceeding the limit value.

It is hard to identify a movement in a time direction on the correlation graph. Therefore, the graph type switcher 140 may connect plots (data) on the correlation graph with arrows to clearly show a behavior in the time direction. Consequently, it is possible to identify a time-series change.

The graph type switcher 140 may use, for example, a marker like a star mark, for example, concerning latest data at present (at the time of the display). Consequently, it is easy to identify a position on the graph of the present plant state.

The above is the explanation in the case of one parameter. The graph type switcher 140 may plot the process value on the correlation graph in the case of two or more parameters. For example, the correlation graph may be set like a three-dimensional graph illustrated in FIG. 5. For example, the graph type switcher 140 may switch and display planes of the Y axis and the X axis in a range of a Z axis in the graph illustrated in FIG. 5.

When the limit values are variable, a relation between the process value of the monitoring target and the process value serving as the parameter (the process value used in the calculation of the limit values) is important. Therefore, limit value curves are defined between the process values. Consequently, it is possible to appropriately grasp an actual plant state by displaying, on the correlation graph, a state in which the process value exceeds the limit value and the plant is in the warning state.

With the plant monitoring apparatus 1 according to the embodiment, since the time-series graph and the correlation graph can be switched and displayed, it is possible to appropriately grasp the plant state.

Modification of the Fourth Embodiment

In a modification of the fourth embodiment of the present invention, the display processor 14 in the fourth embodiment of the present invention further includes a switching enabling determiner 141 (not shown in the figure) that enables the graph type switcher 140 when the limit values are variable values.

Figure 21:
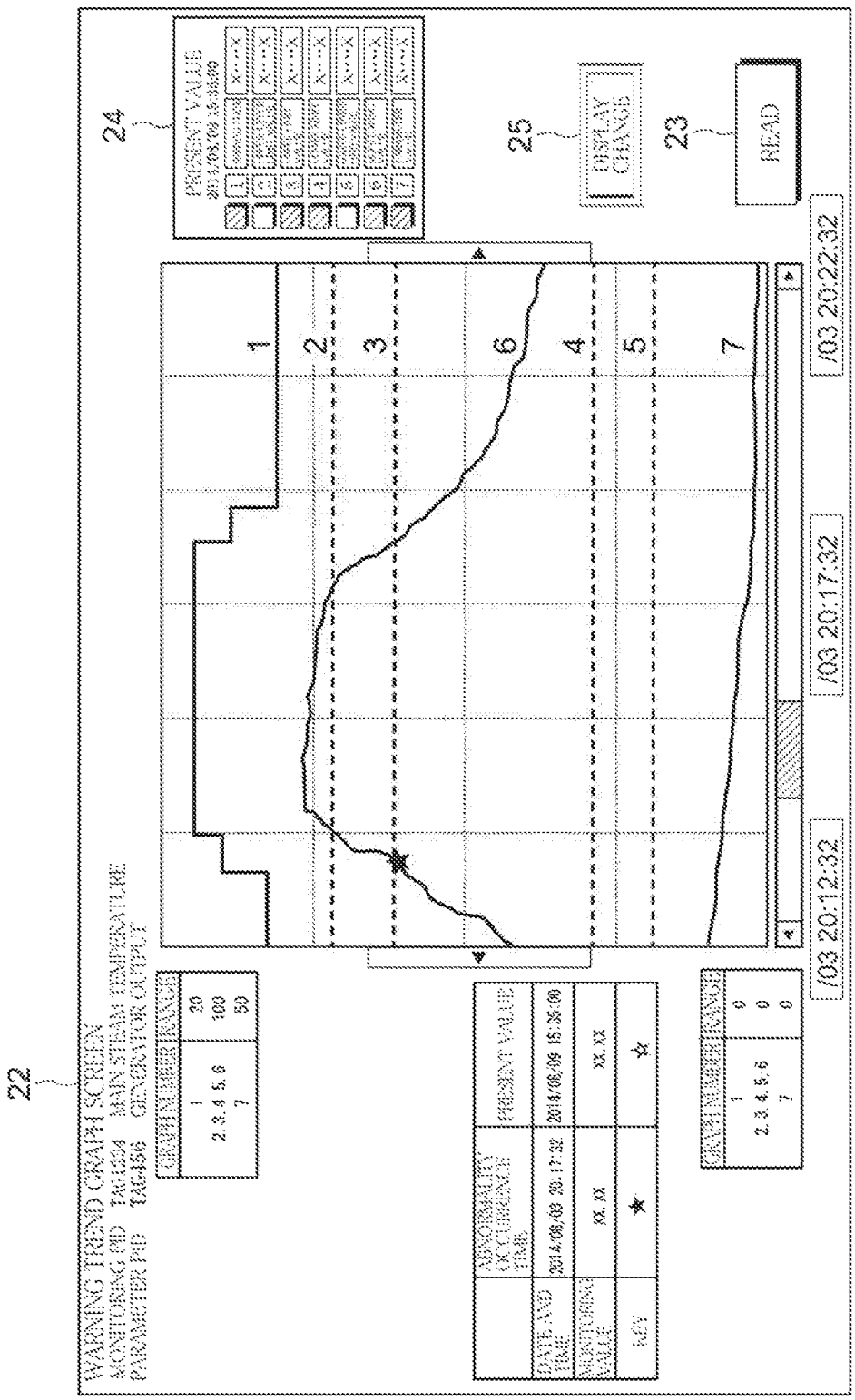
FIG. 21 is a diagram showing a state in which a "display change" button 25 is broken out.

FIG. 21 is a diagram showing a state in which the "display change" button 25 is broken out. When the limit values are not variable values, for example, the switching enabling determiner 141 changes the "display change" button 25 to a break-out or unselectable state as illustrated in FIG. 21. This is because a point that should be set as the horizontal axis (the X axis) of the correlation graph is not defined because the limit values are fixed values.

Therefore, at a stage when the time-series graph is displayed, the switching enabling determiner 141 acquires, from the limit value information data storage 9, information concerning whether a point of a monitoring target is a point managed by variable limit values. Consequently, the switching enabling determiner 141 enables the graph type switcher 140 when the limit values are variable values and disables the graph type switcher 140 when the limit values are fixed limit values.

In this way, it is possible to enable and disable the graph type switcher 140 according to types of the limit values. Consequently, when the limit values are fixed, it is possible to prevent erroneous operation for converting the time-series graph into the correlation graph. For example, it is possible to prevent a blank graph from being displayed when the time-series graph is switched to the correlation graph.

Fifth Embodiment

In a fifth embodiment of the present invention, the plant monitoring apparatus 1 according to the modification of the fourth embodiment of the present invention further includes a graph simultaneous comparison display 142 (not shown in the figure) that causes the display device 3 to display the time-series graph and the correlation graph side by side on the screen of the display device 3 and a correlation graph highlight display 143 (not shown in the figure) that distinguishes a region on the correlation graph corresponding to indicated time on the time-series graph using at least one of a color different from a color of other regions and highlight.

Figure 22:
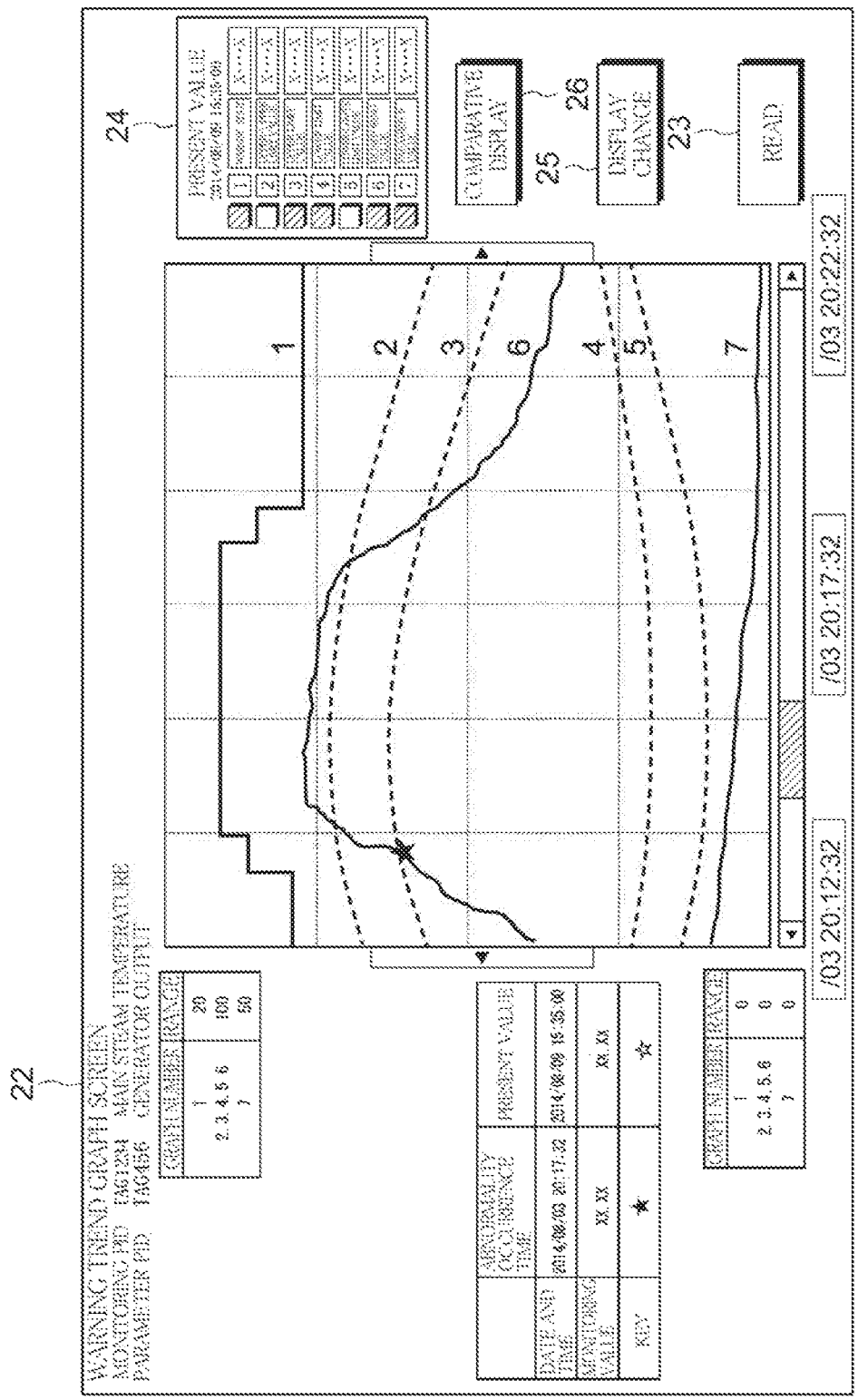
FIG. 22 is a diagram illustrating a "comparative display" button 26.
Figure 23:
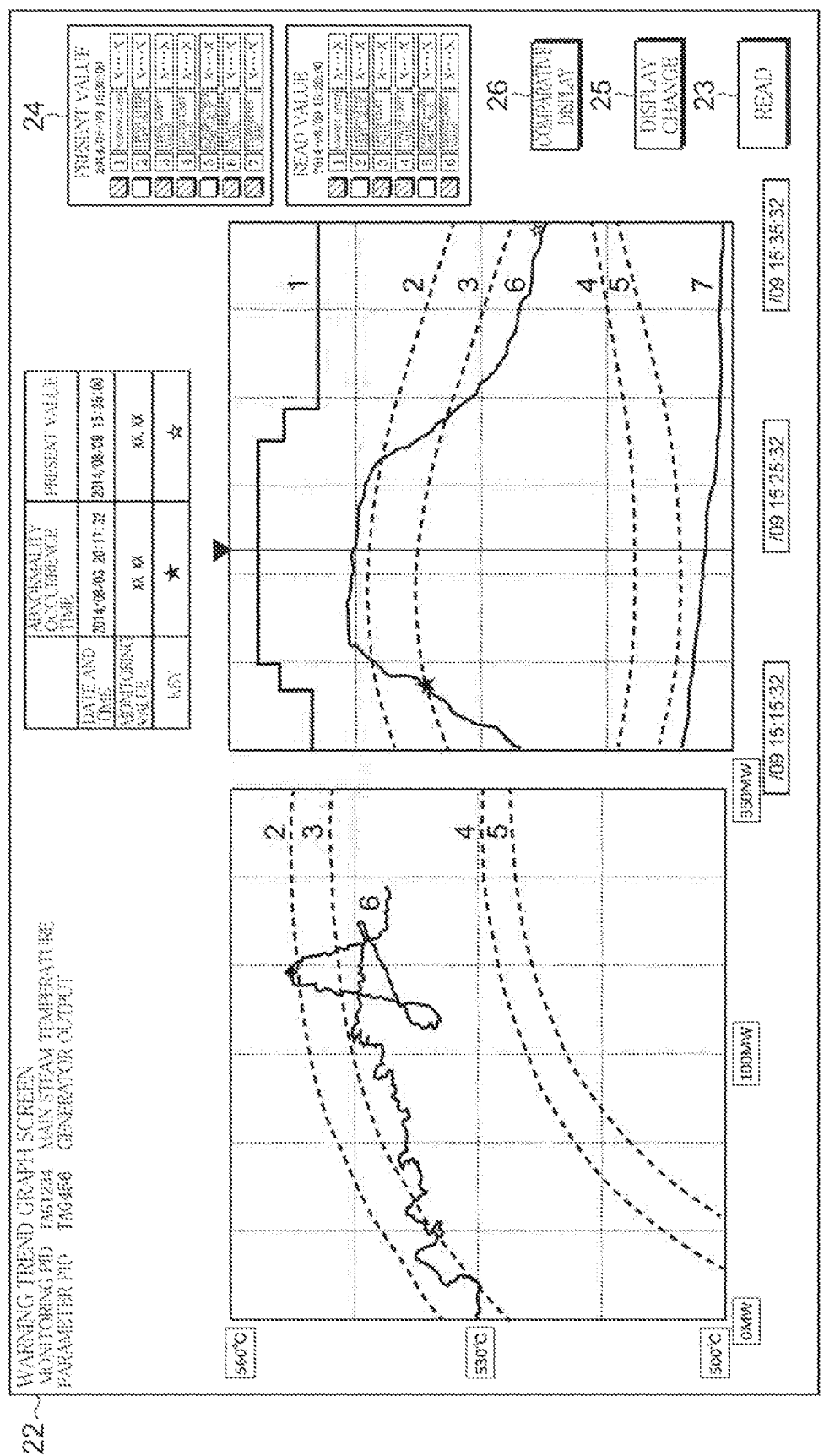
FIG. 23 is a diagram showing a state in which the time-series graph and the correlation graph are displayed side by side on a display device 3.

FIG. 22 is a diagram illustrating a "comparative display" button 26. FIG. 23 is a diagram showing an example in which the display device 3 is caused to display the time-series graph and the correlation graph side by side. For example, the user depresses the "comparative display" button 26 illustrated in FIG. 22 using the interactive input unit 4. In this case, for example, the graph simultaneous comparison display 142 causes the display device 3 to display the time-series graph and the correlation graph side by side on the screen of the display device 3. For example, the graph simultaneous comparison display 142 sets the same graph range in the time-series graph and the correlation graph. Consequently, it is possible to improve a mutual identification property of a positional relation of data. The correlation graph highlight display 143 causes the display device 3 to display a line cursor shown in FIG. 23 on the time-series graph.

Subsequently, the correlation graph highlight display 143 acquires time from a cursor position. For example, the correlation graph highlight display 143 displays values of the process value, the limit values, and the like at that time in a display area in the screen 22. The correlation graph highlight display 143 highlights data of time on the correlation graph corresponding to a cursor position on the time-series graph. In this way, the correlation graph highlight display 143 distinguishes the region on the correlation graph corresponding to the indicated time on the time-series graph using at least one of the color different from the color of the other regions and the highlight.

By displaying the two graphs side by side in this way, it is possible to simultaneously grasp a flow of data in time series and a positional relation between values in the region of the limit values. Consequently, it is easy grasp a plant state. Further, by associating a reading function in the two graphs, there is an effect that it is possible to simultaneously recognize a temporal transition of the plant on the two different graphs.

With the plant monitoring apparatus 1 according to the embodiment, it is possible to check, on the correlation graph, the region corresponding to the region indicated on the time-series graph. Therefore, the plant monitoring apparatus 1 is convenient for grasping the plant state.

Sixth Embodiment

In a sixth embodiment of the present invention, the plant monitoring apparatus 1 according to the fifth embodiment of the present invention further includes a time-series graph highlight display 144 (not shown in the figure) that distinguishes a region on the time-series graph corresponding to time in an indicated range on the correlation graph using at least one of a color different from a color of other regions and highlight.

On the time-series graph, for example, one data designated by a line cursor is determined because two same times are absent on the horizontal axis that indicates time. Therefore, data corresponding to the data is one data on the correlation graph.

On the other hand, a plurality of data are sometimes displayed in the same coordinate on the correlation graph. Therefore, when data on the correlation graph is read, a target is data in a range designated by a closed region such as a circle, a square, or a polygon rather than the line cursor. Therefore, data at a plurality of times are selected during the reading on the correlation graph.

Consequently, when the region on the correlation graph corresponding to the time in the indicated range on the correlation graph is shown on the time-series graph, a plurality of parts on the time-series graph are enabled to be distinguished from the other parts.

Figure 24:
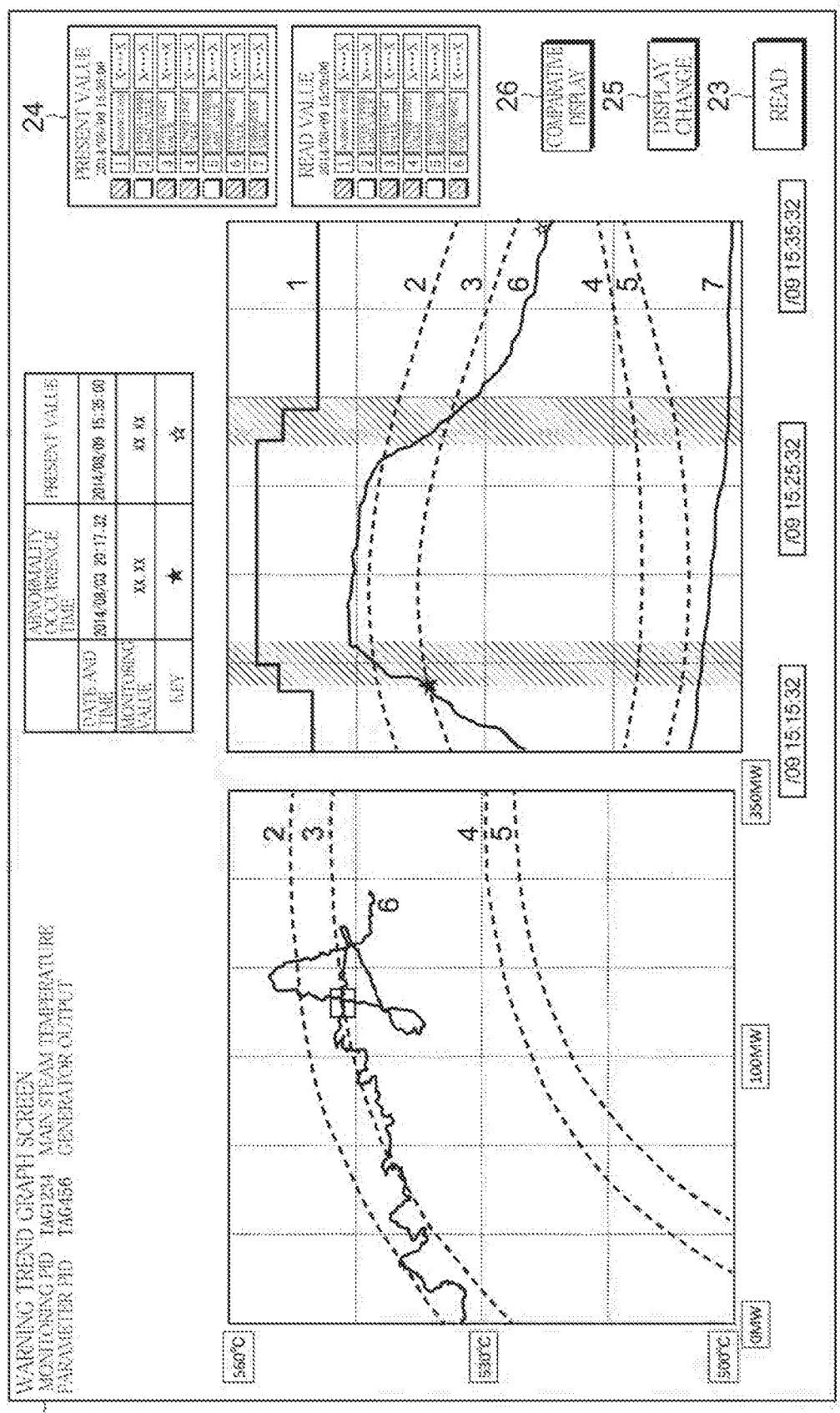
FIG. 24 is a diagram illustrating a region on the time-series graph corresponding to time in an Indicated range on the correlation graph.

FIG. 24 is a diagram illustrating a region on the time-series graph corresponding to the time in the indicated range on the correlation graph. The time-series graph highlight display 144 acquires times of a respective plurality of data indicated by regions (rectangles) on the correlation graph. Consequently, for example, as illustrated in FIG. 24, the time-series graph highlight display 144 displays one or a plurality of regions on the time-series graph corresponding to the time of the range on the correlation graph using highlight display or using a color of a background of a time period corresponding to the region(s) different from a color of other regions.

By displaying the two graphs side by side in this way, it is possible to simultaneously grasp a flow in time series and a positional relation among values in regions of the limit values. Consequently, it is possible to correctly recognize a state of the plant. Further, by associating a reading function in the two graphs, there is an effect that it is possible to simultaneously recognize, on the two different graphs, a temporal transition of an operation state of the plant.

In particular, in the case of designation from the correlation graph, since there are a plurality of data designated by reading, relevant portions of the time-series graph corresponding to the data can be seen at a glance.

With the plant monitoring apparatus 1 according to the embodiment, it is possible to check, on the time-series graph, the region corresponding to the region indicated on the correlation graph. Therefore, the plant monitoring apparatus 1 is convenient for grasping the plant state.

Seventh Embodiment

Figure 25:
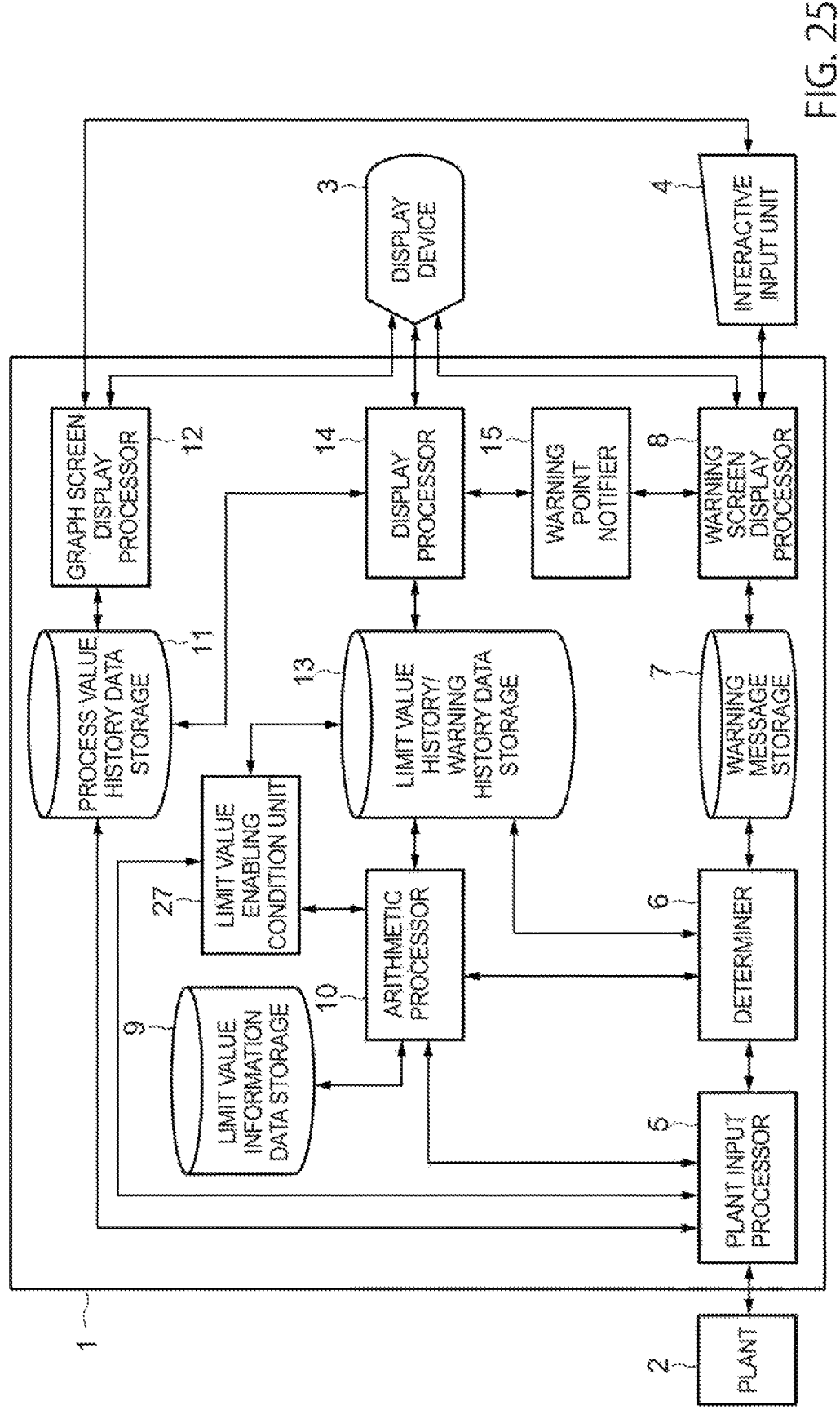
FIG. 25 is a block diagram showing a configuration example of a plant monitoring apparatus according to a seventh embodiment of the present invention.

A seventh embodiment of the present invention is explained with reference to FIG. 25. FIG. 25 is a block diagram showing a configuration example of the plant monitoring apparatus 1 according to the seventh embodiment of the present invention. Components same as the components in the sixth embodiment are denoted by the same reference numerals and signs and explanation of the components is omitted. In the seventh embodiment of the present invention, the plant monitoring apparatus 1 further includes a limit value enabling condition unit 27.

In the plant 2, a plurality of apparatuses of the same type sometimes operate in parallel. For example, there are two feed water pumps to the boiler 410 such as the A feed water pump 380 and the B feed water pump 390 shown in FIG. 1. Consequently, it is possible to select and operate one pump of the two pumps according to an operation state of the boiler 410. For example, when the operation of a boiler at a water feed destination is close to maximum operation, all the feed water pumps are operated. On the other hand, for example, when the operation of the boiler is in an initial state or the like, one of the feed water pumps is selected and operated. In this way, the number of feed water pumps operated in parallel is sometimes changed from one to two or from two to one. When the number of feed water pumps operated in this way is changed from two to one, for example, there is the feed water pump that is stopped operating, although the water feed is performed.

Therefore, the limit value enabling condition unit 27 has a conditional expression for determining whether warning monitoring is carried out on a process value input from the plant input processor 5. The limit value enabling condition unit 27 sets the limit values to be enabled only when the conditional expression holds.

For example, according to a conditional expression for a condition that the feed water pumps are operating, if the feed water pumps are operating, the condition is satisfied and the limit value enabling condition unit 27 can enable the limit values.

The warning determiner 6 performs monitoring only on a process value for which the limit values are enabled. Therefore, the limit value enabling condition unit 27 stores, as a monitoring value, an indicator indicating whether the conditional expression holds in the limit value history/warning history data storage 13 in the storage 30 together with calculated limit values and a warning state.

For example, when process values of discharge pressures of a respective plurality of feed water pumps are monitored, it is possible to enable limit values according to the condition of the plant that the pumps are operating.

Figure 26:
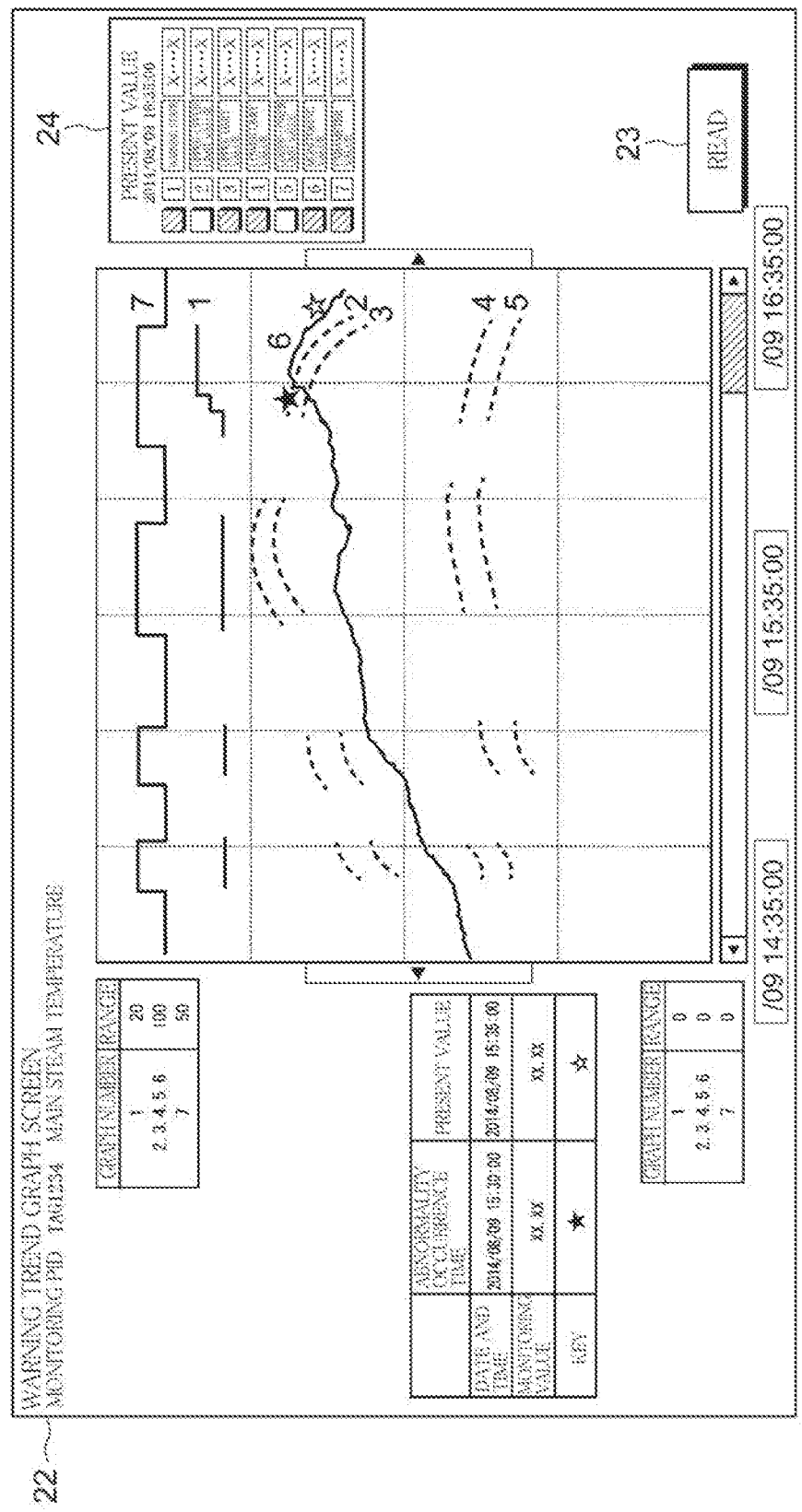
FIG. 26 is a diagram showing an example in which a monitoring value is displayed in time series.
Figure 28:
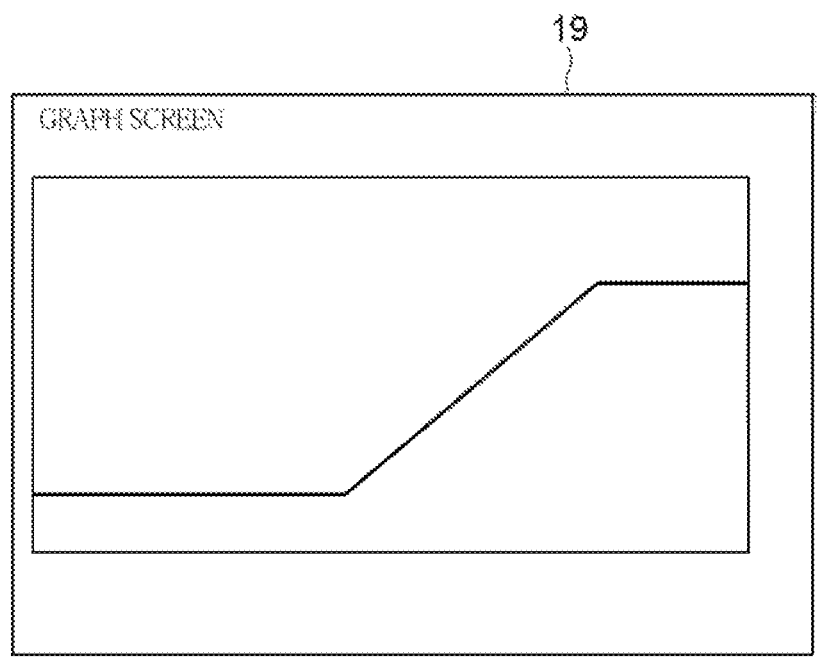
FIG. 28 is a diagram illustrating a graph screen on which a process value is displayed in time series.
Figure 29:
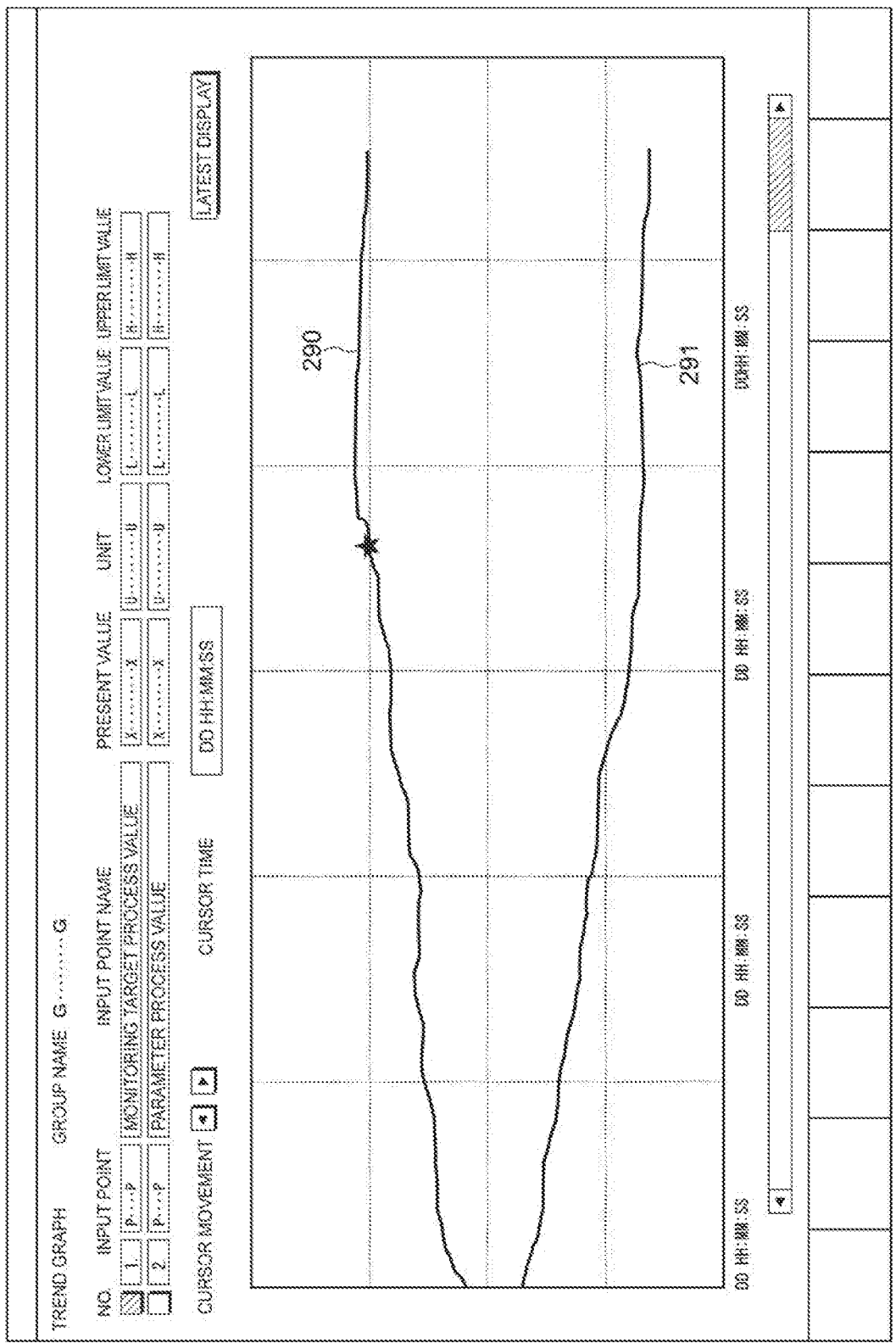
FIG. 29 is a diagram illustrating a time-series change of the process value after the plant falls into a warning state.

FIG. 26 is a diagram showing an example in which a monitoring value is displayed in time series. For example, the display processor 14 displays the limit values as a graph in time series as indicated by the pen numbers 2, 3, 4, and 5 on the warning trend graph screen 22 shown in FIG. 26. For example, the display processor 14 displays, as indicated by the pen number 7 on the screen 22, an enabled state in which the monitoring value is displayed in time series and the condition is satisfied and a disabled state in which the condition is not satisfied.

In this way, it is possible to monitor the process value when the condition is satisfied. Therefore, for example, a wrong warning message is not issued even when the number of operated feed water pumps among the plurality of feed water pumps changes. Since the limit values are displayed on the graph as well, it is possible to improve convenience in plant operation.

The several embodiments of the present invention are explained above. However, the embodiments are presented as examples and are not intended to limit the scope of the invention. These new embodiments can be implemented in other various forms. Various omissions, substitutions, and changes can be made in a range not departing from the gist of the invention. These embodiments and modifications of the embodiments are included in the scope and the gist of the invention and included in the inventions described in claims and a scope of equivalents of the inventions.

The invention claimed is:

1. A plant monitoring apparatus comprising:
an arithmetic processor configured to calculate, as a limit value, in time series, at least one of an upper limit value, a lower limit value having a value smaller than the upper limit value, an upper-upper limit value having a value larger than the upper limit value, and a lower-lower limit value having a value smaller than the lower limit value based on a second process value obtained in time series from a second point associated with a first point and different from the first point in a plant;
circuitry configured to compare a first process value acquired in time series from the first point of a monitoring target in the plant and the limit value corresponding to the first process value to determine a point in time when the first process value exceeds the limit value; and
a display processor configured to cause a display device to display, in time series, the first process value within a time range decided based on the point in time obtained by the circuitry and the limit value corresponding to the first process value, wherein
the circuitry determines whether the first process value acquired in time series exceeds and deviates from the limit value corresponding to the first process value or recovers from a state in which the first process value deviates from the limit value to a state in which the first process value does not deviate from the limit value, the circuitry further generating a warning message associated with occurrence time when the state in which the first process value deviates from the limit value occurs and an occurrence message and a warning message associated with recovery time when the first process value recovers from the state in which the first process value deviates from the limit value to the state in which the first process value does not deviate from the limit value and a recovery message,
the plant monitoring apparatus further comprises:
a warning screen display circuitry configured to
cause the display device to display a warning screen on which the warning messages are listed in time series in order of generation;
indicate any one of the warning messages on the warning screen; and
output information based on time associated with the indicated
warning message to the display processor, and the display processor causes the display device to display, in time series, the first process value and the limit value corresponding to the first process value within the time range including the time in information input from the warning screen display circuitry.

2. The plant monitoring apparatus according to claim 1, wherein the warning screen display circuitry configured to output, as the first point of the monitoring target, a point associated with the indicated warning message, wherein
the display processor causes the display device to display, in time series, the first process value acquired from the first point according to an input from the warning screen display circuitry and the limit value corresponding to the first process value.

3. The plant monitoring apparatus according to claim 1, wherein
the display processor causes the display device to display, in time series, together with the first process value, the limit value calculated by the arithmetic processor and a numerical value indicating a warning state corresponding to the limit value that the first process value exceeds.

4. The plant monitoring apparatus according to claim 1, further comprising a related information history setting processor configured to set, as a related information history, a point different from the point of the monitoring target in the plant, wherein
the display processor causes the display device to display, in time series, a process value corresponding to the set point together with the first process value and the limit value corresponding to the first process value.

5. A plant monitoring apparatus according to claim 1, wherein the display processor includes a graph type switcher capable of switching a time-series graph in which a horizontal axis indicates time and a vertical axis indicates the first process value and a correlation graph in which a horizontal axis indicates a process value used to obtain the limit value and a vertical axis indicates the first process value.

6. The plant monitoring apparatus according to claim 1, further comprising:
a graph simultaneous comparison display configured to cause the display device to display, side by side on a screen of the display device, a time-series graph in which a horizontal axis indicates time and a vertical axis indicates the first process value and a correlation graph in which a horizontal axis indicates a process value used to obtain the limit value and a vertical axis indicates the first process value; and
a correlation graph highlight display configured to distinguish a region on the correlation graph corresponding to indicated time on the time-series graph using at least one of a color different from a color of other regions and highlight.

7. The plant monitoring apparatus according to claim 1, further comprising:
a graph simultaneous comparison display configured to cause the display device to display, side by side on a screen of the display device, a time-series graph in which a horizontal axis indicates time and a vertical axis indicates the first process value and a correlation graph in which a horizontal axis indicates a process value used to obtain the limit value and a vertical axis indicates the first process value; and
a time-series graph highlight display configured to distinguish a region on the time-series graph corresponding to time in an indicated range on the time-series graph using at least one of a color different from a color of other regions and highlight.

8. The plant monitoring apparatus according to claim 1, further comprising: limit value enabling condition circuitry configured to have a conditional expression necessary for determination of presence or absence of monitoring on a process value to be displayed on the display device and, when the conditional expression holds, cause the display device to display a corresponding limit value.

* * * * *